US012737811B2

(12) United States Patent
Doke et al.

(10) Patent No.: US 12,737,811 B2

(45) Date of Patent: Sep. 15, 2026

(54) INTERFACE LAYOUT TO DISCOVER AND OPTIMIZE ECONOMICS OF INFORMATION EXCHANGE OF DIGITALLY VIRTUALIZED PHYSICAL SPACE

(71) Applicant: Tata Consultancy Services Limited, Mumbai (IN)

(72) Inventors: Pankaj Harish Doke, Mumbai (IN); Karan Rajesh Bhavsar, Thane West (IN); Sanjay Madhukar Kimbahune, Mumbai (IN); Srinivasu Pappula, Hyderabad (IN); Sujit Raghunath Shinde, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/787,259

(22) Filed: Jul. 29, 2024

(65) Prior Publication Data

US 2025/0069142 A1 Feb. 27, 2025

(30) Foreign Application Priority Data

Aug. 25, 2023 (IN) ............................ 202321056988

(51) Int. Cl.

*G06Q 40/06* (2012.01)
*G06F 3/04815* (2022.01)

(52) U.S. Cl.

CPC ......... *G06Q 40/06* (2013.01); *G06F 3/04815* (2013.01)

(58) Field of Classification Search

CPC ..................................................... G06Q 40/06
See application file for complete search history.

(56) References Cited

U.S. PATENT DOCUMENTS 8,781,944 B2 * 7/2014 Olsson .................. G06Q 40/04
10,243,743 B1 * 3/2019 Madisetti ................. H04L 9/32

(Continued)

OTHER PUBLICATIONS

Jose et al., in "Socio-psychological constructs and perceived economic variables impacting the farmer producer organization members in Kerala: A quantitative analysis," from Asian Journal of Agricultural Extension, Economics and Sociology, 2023 (Year: 2023).*

(Continued)

*Primary Examiner* — Mike Anderson
*Assistant Examiner* — Brandon M Duck
(74) *Attorney, Agent, or Firm* — FINNEGAN, HENDERSON, FARABOW, GARRETT & DUNNER LLP

(57) ABSTRACT

Unaddressed technical problem is how to make the window manager select and update the appropriate visual design given the Just-In-Time constraint to optimize Profit/Economic Goal for a Basic Emergent User and not have a locking/permanent binding on a particular Socio Economic Cohort (SEC) or Contract Management System Companies (CMSCs). A method and system is disclosed that provides interface layout to discover and optimize economics of information exchange of digitally virtualized physical space for a Basic Emergent User (BEU). A correlation score is determined based on correlation between i) the expected profit range provided by the BEU indicating the tolerance around the SP (selling price) and ii) the buying price (BP) and the tolerance specified by the SEC or the CMSC to identify a best match for the BEU based on goal provided by the BEU in terms of expected profit range and corresponding time range within which it is to be achieved.

20 Claims, 15 Drawing Sheets

(56) References Cited

U.S. PATENT DOCUMENTS

| | | | | |
|---|---|---|---|---|
| 11,996,081 | B2 * | 5/2024 | Radostev | G10L 13/08 |
| 2024/0095727 | A1 * | 3/2024 | Choi | G06Q 20/30 |

OTHER PUBLICATIONS

Beriya, "Open Access Digital Platforms to Enforce Competition in Contract Farming," ICT India Working Paper #47 (2021).

Bhosle et al., "Digital Identity Creation and E-Commerce for FPO's," Research Review International Journal of Multidisciplinary, 4(4) (2019).

Deka et al., "Rico: A Mobile App Dataset for Building Data-Driven Design Applications," (2017).

Nedumaran et al., "Digital integration to enhance market efficiency and inclusion of smallholder farmers: a proposed model for fresh fruit and vegetable supply chain," International Food and Agribusiness Management Review, 23(3) (2020).

* cited by examiner

FIG. 4

Pinch Zoom (Navigate +ve and -ve Z axis),
Swipe Left (Panning -ve X axis),
Swipe Right (Panning +ve X axis),
Swipe Up (Panning -ve Y axis),
Swipe Down (Panning +ve Y axis),
Circular Anticlockwise Fast (SEC - Sampling Fast),
Circular Anticlockwise Slow (SEC - Sampling Slow),
Circular Clockwise Fast (CMS - Sampling Fast),
Circular Clockwise Slow (CMS - Sampling Slow),

INTERFACE LAYOUT TO DISCOVER AND OPTIMIZE ECONOMICS OF INFORMATION EXCHANGE OF DIGITALLY VIRTUALIZED PHYSICAL SPACE

PRIORITY CLAIM

This U.S. patent application claims priority under 35 U.S.C. § 119 to: India Application No. 202321056988, filed on Aug. 25, 2023. The entire contents of the aforementioned application are incorporated herein by reference.

TECHNICAL FIELD

The embodiments herein generally relate to the field of system information exchange and associated economics and, more particularly, to a method and system for interface layout to discover and optimize economics of information exchange of digitally virtualized physical space for a Basic Emergent User (BEU).

BACKGROUND

Information has tremendous potential, and exchange or sharing of such information can result in the information owner gaining significantly, specifically in terms of monetary gains. Thus, generating techniques and systems for the smart use of the information is needed. If a user is aware of the information they hold, and wise enough to monetize it, the user is at an advantage. However, a majority of the world's population, specifically in developing countries, fall into the category of a Basic Emergent Users (BEUs), who are less literate or poor literate and not tech savvy users.

For example, in countries like India there are many families who have small dwellings (1 Room, 1 Room-Kitchen, 1 BedroomHallKitchen) (less than 300 sqft). These families typically have a BEU profile. In Urban areas in India, like Mumbai, about 80% of the population is in this context. These physical spaces also have data generating and data consuming entities. An example of Data Consuming entity may include content on TV via Set Top Box, Smart Phone based apps, Print Media such as Posters, Newspapers, other humans (sales personnel), physical spaces such as balconies (to consume advertisement and to showcase via banners and boards) and so on. Examples of Data Generating entities are their Smartphone (via Telemetry), Television (broadcasting devices), Meters (via electric meters), themselves (via pen-paper surveys), participation in local games (such as Housie). Generally, BEU users do not get good compensation for information generated via their data generation entities. For example, the compensation for a survey could be INR50/- or free based on the socio-eco-political context of the user. On the other hand, the final consumer of this information, say a big brand, dispenses with a large amount of economic and allied benefits for this information and also significantly more from using this information in their decision and mechanism. For example, a ketchup company can decide the right proportion of spice to be added to their product using the survey to increase its consumer base, effectively the economic returns.

Similar to the above scenario, in the agriculture domain, 90% of farmers have small land holdings (e.g., less than 2.5 acres) and are identified as marginal farmers. The above farmer class falls into the BEU category. It is observed that theses farmers do not get a good valuation for their i) produce, and ii) information they hold and share about their land/soil/crop, which may be used without their knowledge and permission in data or information-based systems for economic gains. For example, in developed countries satellite images of the farms are used to predict the stage of the crop and quality of the crops and traders use this information to take positions of profit on the global commodity markets. The landholder (BEU) gets no share in this revenue. Similarly, human surveyors survey the fields and grade the produce and intermediaries in the market chain arrive at pricing structures. In all these mechanisms the BEU is a passive and helpless entity whose information is used by one and all but with no economic benefit or advantage to the BEU. The only direct control they (the BEU) have is on the produce and the price they may be able to negotiate or discover or get on the market—which are either local markets, local procurement agents or larger markets (mandis) at a travelable distance. For better price discovery in larger markets say, in the Agricultural Produce Market Committee (APMC) in a big city they (the BEU) may need to travel, need transportation, spend on labor and incur other costs. A further challenging part is that the region of discovery of better pricing now remains limited to only that city the farmer has identified to travel to, and it may not be feasible to explore Agri-markets in multiple cities simultaneously. Thus, the BEU is not in an optimal position for a better price realization of this produce and information about produce while it is in various stages of growth.

The above problem is conventionally addressed by creating Farmer Producer Organizations (FPO). This is equivalent to the advantages one can acquire/get by having Group Power/Cohort Power. This leads to bargaining for better input costs such as lower price fertilizer (bulk purchase) and better price for produce (bulk selling) to Business to Business (B2B) entities. For example, a Tomato farmer FPO selling in bulk to a big ketchup company. The concept of FPO is equally beneficial to the ketchup company. Instead of dealing with small farmers—they deal with an organization of a few 100 to 1000 farmers. This aggregation of the BEU into FPOs, generally referred to as Socio Economic Cohorts (SECs) has advantages. Having said that, there are limitations on the number of SECs/FPOs, like 10000 of FPOs in India. Moreover, the SEC/FPO are geographically related. That is, even though Hapus/Alphonso Mango is grown in Konkan (Maharashtra), Gujarat and Karnataka, it is likely that the Konkan region FPO will not have BEU from Gujarat or Karnataka. Thus, there are no benefits beyond the geo-local aggregation unit. Apart from this SEC/FPO are political in nature and hence there are other socio-political-economy aspects to it. Further, given this background, BEU has no loyalty to SEC/FPO and is free join more than one SEC/FPO. That is, there is a many to many relationships between BEU and SEC/FPO.

Similarly, in an Urban context example, BEUs come together and form Self Help Groups (SHGs), interchangeably referred to as SECs, which gives them better power with respect to the financing agencies, such as Non-Banking Financial Companies (NBFCs). In this urban scenario, the financing agencies need more and newer SECs, which are reliable in terms of repayment, and the SHG needs access to more and better financing agencies for negotiating better credit and sale terms. However, conventionally the urban SHG is a geo-closed group, where people in a SHG of suburb of the city are unlikely to have the same SHG as that of a far way suburb, while, if they could, they get better terms of credit and sale.

As can be readily understood from the above discussion, the immediate implication of this is that big companies or organizations referred to as Contract Management System Company (CMSC) have to negotiate contracts with multiple SEC/FPO/SHG to ensure consistency of quality and quantity of produce which they need every Agri-season or data quality in terms of user control information devices and sources. Thus, there isa many to many relationships between SEC/FPO/SHG and CMSC with switching costs.

The core basis of this is the Contract drawn between the CMSC and SEC/FPO/SHG and a back contract drawn between SEC/FPO/SHG and BEU. All parties are untrusted but nonetheless expect that their contracts are respected to ensure that their business operations are not negatively impacted.

As can be understood from a resource view, the BEU has the least resources, slightly more with SEC/FPO/SHG and most with CMSCs. Ergo, the benefits are hence skewed towards CMSCs followed by SEC/FPO/SHG and finally BEU.

The challenges of the BEU is the inability to explore newer SEC/FPO/SHG/CHS and newer CMSCs, where the benefits are in favor of BEU given a set of CMSCs {1<=N<=k}(where, N is number of CMSCs) and similarly for a set of SEC/FPO {1<=M<=k}(where, M is number of SECs/FPOs). This is practically not possible due to limited education of BEU, limited understanding of financial markets, Agri-produce market, commodity futures, data markets. Also given language and economic and geography constraints, BEU cannot explore CMS-CN in other geographies. Thus, farmer in one state (for example, Konkan region of India) connecting to CMSC in another far away state such as Punjab or in Mizoram is practically not happening. This resource shortcoming gets further compounded due to the untrusted nature of the participating parties (without a central mediating agency) and the time constraints inherent in Agri produce as Agri produce is perishable and needs a time bound decision. For example, Coriander leaves whither in 24 hours of harvest and the farmer needs to take a decision on FPO/CMSC within 30 minutes before harvest and cannot decide in 3 days. Another example that helps to understand natural time constraint on saleable item is media content. A streamed content at prime time of 2100 hours with each episode of 30 minutes is no more a content with demand since the broadcasting of the episode has made it available to majority of public. Thus, it is important to sell it within a certain time constraint to get maximum economic returns. The perishable characteristic of a item imposes a natural time constraint on the system to suggest buyers for the item within the time constraint imposed by perishable nature of that particular item. Thus, the system has to close the answer in a defined time window for a particular crop and does not have infinite time. On the other hand, the number of choices to check are very large and the screen space is small. This imposes a technical challenge on the user.

To address the above problem for SEC or CMSC selection for the end user such as the BEU from among a big chunk of most appropriate ones, modern capabilities of the smartphones capable of extracting and presenting intended information can be used. However, the end user being BEU, there is a need that the right set of SECs or CMSCs has to be identified for the BEU based on their requirements. Further to this, the BEU may generally own basic smartphones and characteristically has limited knowledge to extract and consume the right information from the large volume of information presented to him over his mobile device (smartphones).

To situate information display task into a technical problem, the basic smart phone has a display of 5.25 inch, which is the most common low/mid-range phone used by the BEU. The problem to be addressed is that the BEU has to decide a Just in Time (Time Constraint) of whom to ship the produce to (and with a goal of a certain Economic Value) with a variation of Existing/Tried CMSC/FPO-SEC/SHG-SEC and Newer Tried/Unknown CMS-CN/FPO-SEC/SHG-SEC so that the business future of the BEU is secured and price discovery is optimal. Current conventional window/visual design techniques, which automates the layout of the information on the phone and visual decoration/embellishments are not designed or fine-tuned for the BEU but have generic approaches.

Similarly, in a reflective manner the CMSC needs to know all the information of the BEU in India for a crop say rice on their mobile screen and they need to decide quickly since they cannot keep their production plants idle. They too have a time constraint and production constraint. Also, the SEC-FPO/SEC-SHG need their CEO to see all the information of the plots of the member BEU on their mobile screen all the time. As can be seen each of the parties have their unique constraints and want their screens to display that information accordingly.

Thus, the unaddressed technical problem is how to make the window manager select and update the appropriate visual design given the Just in Time constraint to optimize Profit/Economic Goal for a BEU and not have a locking/permanent binding on a particular CMSC.

SUMMARY

Embodiments of the present disclosure present technological improvements as solutions to one or more of the above-mentioned technical problems recognized by the inventors in conventional systems.

For example, in one embodiment, a method for discovering and optimizing the economics of information exchange of digitally virtualized physical space for the Basic Emergent User (BEU) is provided.

The method includes displaying by the mobile device of the BEU, a digitally virtualized physical space of a plurality of physical asset holdings of a Basic Emergent User (BEU) on a display screen of the mobile device on detecting an activation event, wherein the digitally virtualized physical space for each of the plurality of physical asset holdings is associated with a geographical location.

Thereafter, the method includes prompting the BEU to provide a goal in terms of a tuple comprising i) an expected profit range, indicative of selling price and a tolerance around the selling price, for a physical asset holding among the plurality of physical asset holdings and an associated status information of the physical asset holding, and ii) a time range within which the expected profit range is to be obtained, wherein the BEU selects the physical asset holding via the digitally virtualized physical space displayed on the display screen.

Further, the method includes populating a plurality of Socio Economic Cohorts (SECs) and a plurality of Contract Management System Companies (CMSCs) to be displayed on the display screen based on a plurality of conditions comprising: the plurality of SECs and the plurality of CMSCs lie within a geo-radius with the physical asset holding as a center, wherein the geo-radius is derived from the time range, the plurality of SECs and the plurality of CMSCs satisfy a criteria of being profitable with financial solvency, the plurality of SECs and the plurality of CMSCs is a mix of known, unknown, trusted, and untrusted SECs and CMSCs, and the plurality of SECs and the plurality of CMSCs for which the selling price and the tolerance provided by the BEU and a buying price and the tolerance specified by a SEC or a CMSC is within a predefined limit to maximize a BEU profit equation.

Thereafter, the method includes determining a correlation score based on correlation between i) the expected profit range indicative of the selling price and the tolerance around the selling price, provided by the BEU and ii) the buying price and the tolerance specified by the SEC or the CMSC displayed on the display screen, wherein a maximum correlation score is displayed on the display screen and the SEC or the CMSC associated with the maximum correlation score is highlighted to the BEU, wherein positioning of the display in sequence from the unknown, the known, the trusted and the untrusted SECs and CMSCs on the display screen follows a most accessible screen space to least accessible screen space approach that drives the BEU to explore the unknown.

Furthermore, the method includes detecting one or more predefined gestures performed by the BEU to accordingly explore the plurality of SECs and the plurality CMSCs to be displayed on the display screen and in accordance with the one or more predefined gestures updating the maximum correlation score based on an updated plurality of SECs and an updated plurality of CMSCs displayed on the display screen, wherein the BEU has option to terminate the exploration when an intended maximum correlation score is displayed.

Thereafter, the method includes prompting the BEU to select a contract partner for trading of at least one of i) the physical asset holding and ii) the associated status information of the physical asset holding from the updated plurality of SECs and the updated plurality of CMSCs.

Thereafter, the method includes initiating a digital contract between the BEU and the selected contract partner, wherein the digital contract is recorded on detecting a predefined confirmation gesture on the display screen, wherein the digital contract is agreed and executed on a shared common ledger, and wherein the digital contract enables direct trading of at least one of i) the physical asset holding, and ii) the associated status information of the physical asset holding.

In another aspect, a system for discovering and optimizing the economics of information exchange of digitally virtualized physical space for the Basic Emergent User (BEU) is provided. The system comprises a plurality of Basic Emergent Users (BEUs), a plurality of Socio Economic Cohorts (SECs) and a plurality of Contract Management System Companies (CMSCs) capable of extraction and usage of information of each other via application installed on a mobile device associated with each of the plurality of BEUs, the plurality of SECs and the plurality of CMSCs. The mobile device at a BEU end from among the plurality of BEUs comprising a memory storing instructions; one or more Input/Output (I/O) interfaces; and one or more hardware processors coupled to the memory via the one or more I/O interfaces, wherein the one or more hardware processors are configured by the instructions to display a digitally virtualized physical space of a plurality of physical asset holdings of a Basic Emergent User (BEU) on a display screen of the mobile device on detecting an activation event, wherein the digitally virtualized physical space for each of the plurality of physical asset holdings is associated with a geographical location validated by satellite sensors and remote sensing using hyperspectral imaging.

Thereafter, the mobile device is configured to prompt the BEU to provide a goal in terms of a tuple comprising i) an expected profit range, indicative of selling price and a tolerance around the selling price, for a physical asset holding among the plurality of physical asset holdings and an associated status information of the physical asset holding, and ii) a time range within which the expected profit range is to be obtained, wherein the BEU selects the physical asset holding via the digitally virtualized physical space displayed on the display screen.

Further, the mobile device is configured to populate a plurality of Socio Economic Cohorts (SECs) and a plurality of Contract Management System Companies (CMSCs) to be displayed on the display screen based on a plurality of conditions comprising: the plurality of SECs and the plurality of CMSCs lie within a geo-radius with the physical asset holding as a center, wherein the geo-radius is derived from the time range and validated by satellite sensors comprising of remote sensing, the plurality of SECs and the plurality of CMSCs satisfy a criteria of being profitable with financial solvency, the plurality of SECs and the plurality of CMSCs is a mix of known, unknown, trusted, and untrusted SECs and CMSCs, and the plurality of SECs and the plurality of CMSCs for which the selling price and the tolerance provided by the BEU and a buying price and the tolerance specified by a SEC or a CMSC is within a predefined limit to maximize a BEU profit equation.

Thereafter, the mobile device is configured to determine a correlation score based on correlation between i) the expected profit range indicative of the selling price and the tolerance around the selling price, provided by the BEU and ii) the buying price and the tolerance specified by the SEC or the CMSC displayed on the display screen, wherein a maximum correlation score is displayed on the display screen and the SEC or the CMSC associated with the maximum correlation score is highlighted to the BEU, wherein positioning of the display in sequence from the unknown, the known, the trusted and the untrusted SECs and CMSCs on the display screen follows a most accessible screen space to least accessible screen space approach that drives the BEU to explore the unknown.

Furthermore, the mobile device is configured to detect one or more predefined gestures performed by the BEU to accordingly explore the plurality of SECs and the plurality CMSCs to be displayed on the display screen and in accordance with the one or more predefined gestures updating the maximum correlation score based on an updated plurality of SECs and an updated plurality of CMSCs displayed on the display screen, wherein the BEU has option to terminate the exploration when an intended maximum correlation score is displayed.

Thereafter, the mobile device is configured to prompt the BEU to select a contract partner for trading of at least one of i) the physical asset holding and ii) the associated status information of the physical asset holding from the updated plurality of SECs and the updated plurality of CMSCs.

Thereafter, the mobile device is configured to initiate a digital contract between the BEU and the selected contract partner, wherein the digital contract is recorded on detecting a predefined confirmation gesture on the display screen, wherein the digital contract is agreed and executed on a shared common ledger, and wherein the digital contract enables direct trading of at least one of i) the physical asset holding, and ii) the associated status information of the physical asset holding.

In yet another aspect, there are provided one or more non-transitory machine-readable information storage mediums comprising one or more instructions, which when executed by one or more hardware processors causes a method for discovering and optimizing the economics of information exchange of digitally virtualized physical space for the Basic Emergent User (BEU).

The method includes displaying by the mobile device of the BEU, a digitally virtualized physical space of a plurality of physical asset holdings of a Basic Emergent User (BEU) on a display screen of the mobile device on detecting an activation event, wherein the digitally virtualized physical space for each of the plurality of physical asset holdings is associated with a geographical location and validated by satellite sensors and remote sensing using hyperspectral imaging.

Thereafter, the method includes prompting the BEU to provide a goal in terms of a tuple comprising i) an expected profit range, indicative of selling price and a tolerance around the selling price, for a physical asset holding among the plurality of physical asset holdings and an associated status information of the physical asset holding, and ii) a time range within which the expected profit range is to be obtained, wherein the BEU selects the physical asset holding via the digitally virtualized physical space displayed on the display screen.

Further, the method includes populating a plurality of Socio Economic Cohorts (SECs) and a plurality of Contract Management System Companies (CMSCs) to be displayed on the display screen based on a plurality of conditions comprising: the plurality of SECs and the plurality of CMSCs lie within a geo-radius with the physical asset holding as a center, wherein the geo-radius is derived from the time range, and validated via satellite based imagery and remote sensing using hyperspectral imaging, the plurality of SECs and the plurality of CMSCs satisfy a criteria of being profitable with financial solvency, the plurality of SECs and the plurality of CMSCs is a mix of known, unknown, trusted, and untrusted SECs and CMSCs, and the plurality of SECs and the plurality of CMSCs for which the selling price and the tolerance provided by the BEU and a buying price and the tolerance specified by a SEC or a CMSC is within a predefined limit to maximize a BEU profit equation.

Thereafter, the method includes determining a correlation score based on correlation between i) the expected profit range indicative of the selling price and the tolerance around the selling price, provided by the BEU and ii) the buying price and the tolerance specified by the SEC or the CMSC displayed on the display screen, wherein a maximum correlation score is displayed on the display screen and the SEC or the CMSC associated with the maximum correlation score is highlighted to the BEU, wherein positioning of the display in sequence from the unknown, the known, the trusted and the untrusted SECs and CMSCs on the display screen follows a most accessible screen space to least accessible screen space approach that drives the BEU to explore the unknown.

Furthermore, the method includes detecting one or more predefined gestures performed by the BEU to accordingly explore the plurality of SECs and the plurality CMSCs to be displayed on the display screen and in accordance with the one or more predefined gestures updating the maximum correlation score based on an updated plurality of SECs and an updated plurality of CMSCs displayed on the display screen, wherein the BEU has option to terminate the exploration when an intended maximum correlation score is displayed.

Thereafter, the method includes prompting the BEU to select a contract partner for trading of at least one of i) the physical asset holding and ii) the associated status information of the physical asset holding from the updated plurality of SECs and the updated plurality of CMSCs.

Thereafter, the method includes initiating a digital contract between the BEU and the selected contract partner, wherein the digital contract is recorded on detecting a predefined confirmation gesture on the display screen, wherein the digital contract is agreed and executed on a shared common ledger, and wherein the digital contract enables direct trading of at least one of i) the physical asset holding, and ii) the associated status information of the physical asset holding.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4 is a schematic depiction of a display screen of a mobile device of the BEU requesting information from the BEU to initiate discovery of Socio Economic Cohorts (SECs) and Contract Management System Companies (CMSCs or CMS-CNs) in context of the information, in accordance with some embodiments of the present disclosure.

FIGS. 9A and 9B are state diagrams depicting change of state of a SEC or a CMSC from unknown, known, trusted to untrusted, in accordance with some embodiments of the present disclosure.

Figure 1:
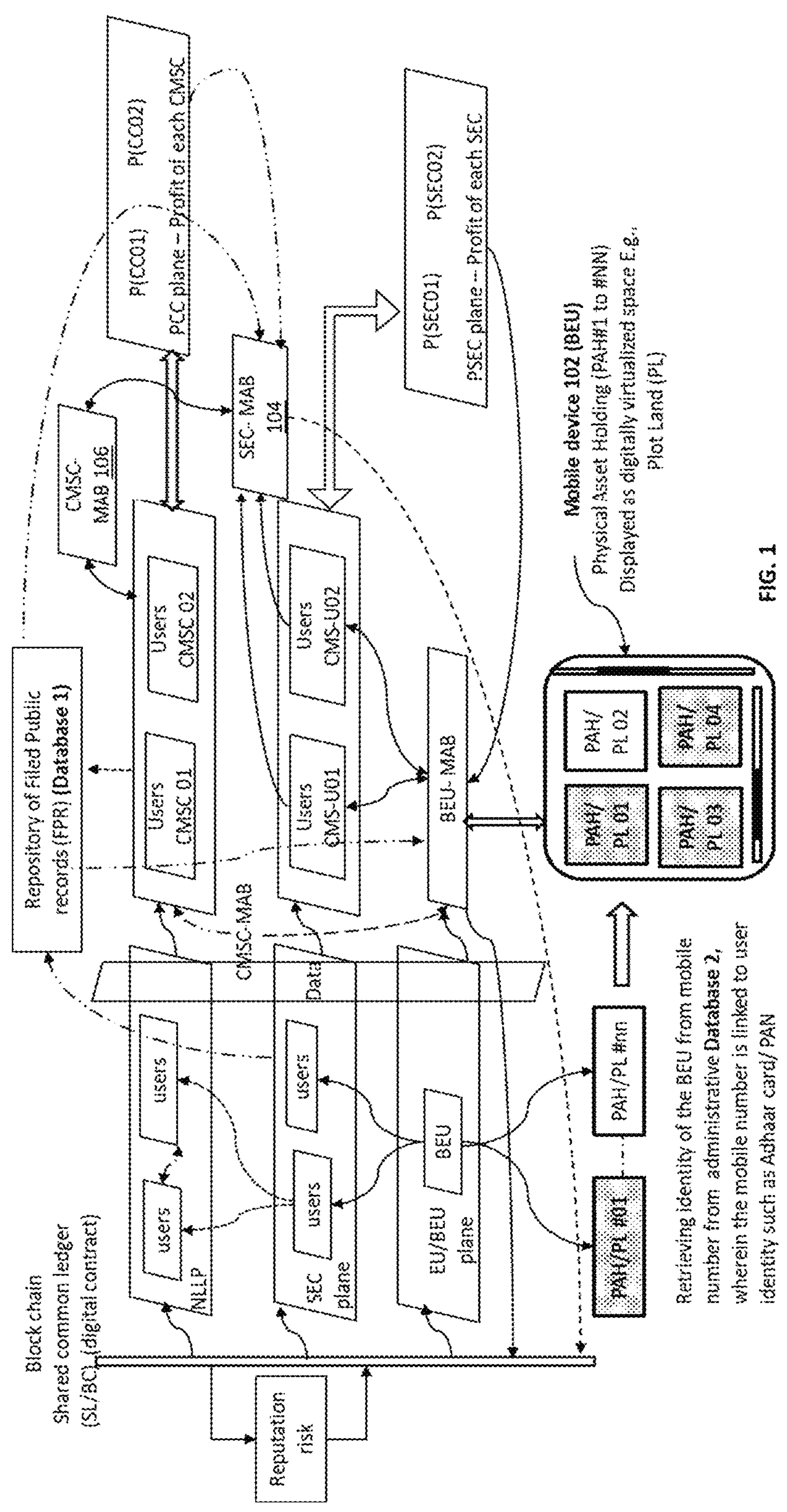
FIG. 1 depicts an architectural overview of a system for discovering and optimizing the economics of information exchange of digitally virtualized physical space for a Basic Emergent User (BEU), in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As discussed in the background section above, the problem statement or technological gap is the ability to dynamically just-in-time display information on the mobile screen of a Basic emergent User (BEU) as per the BEU's (Goals, Time, Trust, Space) expectations, which allows the BEU to optimize on the specified Goal within the specified time. Conceptually, use of the 2D device as an information device with capability to explore along 3 conceptual dimensions needs to be explored. The BEU capabilities can be expressed along 3 axes of goals-time, cognitive capabilities, and physiological capabilities.

The current smartphone technology uses a static visual layout and display mechanism on the phone. The display layout is specified in a static XML with data bindings/mapping and the window manager uses it to display the data in that layout. These bindings are not changeable, and the structure and layout geometry is not changeable once defined.

The current machine capabilities are generic, tuned to 'everyone' without being personalized to an individual—that is the layout is not tuned to adapt to the specified values of the user along the 3 axes of goals-time, cognitive capabilities, and physiological capabilities. Each axis will have a different measure (value) for each user. Thus, there exists a large number of users with varying values of the measure along each axis.

The current software for display does not account for this and all these measures along each axis collapse into one axis, so all users are treated the same. This is sub-optimal or poor design. The display is not adapted to each value specific to each user archetype. Thus, there is a layer needed for machine intervention between current capabilities of the window manager and the objective technical goals of the BEU and to personalize it for each BEU.

Thus, the current mobile technology associated with information display does not tend to address personalization in context of type of user, especially the BEU.

Embodiments of the present disclosure provide a method and system for discovering and optimizing economics of information exchange of digitally virtualized physical space for the Basic Emergent User (BEU) by providing an interface layout over mobile devices. The BEU maybe a mobile user who is less literate or illiterate and is not tech savvy mobile device user. The BEU is that user who has can merely handle the smartphone. BEU and may not have capability to explore or consume information the way it is provided by standard interface technologies. Thus, an added effort is required to enhance interface technology to be of true optimized help to the BEU.

Research has indicated that certain zones on the physical display screen of the phone have higher probability as compared to others—such zones are called hotspots. The method disclosed herein ensures that entities such as Socio Economic Cohorts (SECs) and Contract Management System Companies (CMSCs, interchangeably referred to as CMS-CNs) discovered to be displayed on a display screen of the mobile device for a setting of Goal, Time from the set of trusted, untrusted entities get an opportunity via a layout manager to be displayed at these zones. Current smart phone display mechanisms treat all the zones of the screen as equal probable in terms of the layout manager.

The current navigate-explore mechanism for a BEU while searching for a SEC/CMSCs rely on the user manually doing the analysis and then making the user a part of the SEC. The challenge is that post registration the BEU is able to ascertain the impact of the registration on the BEU goals. The method disclosed automates this process and auto-registers the BEU with any or all the SEC wherein these meet the Goals set by the BEU.

Similarly, once an entity is identified by the searcher, manual contract registration process has challenges of time efficiency and error rate. The method disclosed automates the contract for the BEU-SEC-CMSC been digitally auto-registered on a shared common ledger of Blockchain network.

Thus, the method disclosed provides a layer needed for machine intervention between current capabilities of the window manager and the business of the BEU.

There exist certain challenges while addressing the above problem. The challenges and the approach disclosed by the method is discussed below. Cohort users comprising Basic Emergent Users are not skilled in the art of optimum price discovery given the constraint of time and hence implied perishability of production or consumable content or instant telemetric. Example prices of coriander leaves in the morning are higher than towards the end of the day when they have to dispose of the garbage. Similarly, in a certain agroclimatic zone, BEUs are likely to have similar effects, that is T(A), and T(B) are time bounded for production cycle of a crop, where A and B are BEU and T(A) and T(B) is the time of harvesting for the same crop C; that is even though T(A) and T(B) are different, they are range bound, since their sowing windows were in the same range bound. For example, the sowing seed window for coriander in a geography, say, Pune district, will be broadly constrained in a season, say rainy season, to a certain weeks of the calendar, W1W2W3 (week 1, week2 week3) of the month of June; thereby the production or harvest of the crop is hence also in the same week. Such an overlapping production window gives a higher probability Pr(CropProd) for a certain window T(C-D), where C-D are related to the sowing windows W1W2W3. Such an event of overlapping production harvest schedule results in lower pricing power for the Cohort (SEC). Hence, if the window is machine split with allocation of production harvest to each SEC, it can result in a delta profit-margin better than when the cohort is a non-cooperating structure. Contemporary attributes of SEC suggests that they do have the technical skills to arrive at this probability distribution given their capability levels.

EXAMPLE: For a Crop—C1, a time window T{C[A]} to T{C[B]} is available, where A and B are 2 points in time in the calendar (say June) when the sowing for that crop C1—can happen. Thus, the technical problem is to distribute a set of BEU between A and B such that their harvest is uniformly distributed, and they do not impact the pricing by supply within a short duration of time. So when it is known that the BEU has a particular crop—when BEU chose that in the interface—and the system confirms via hyperspectral imaging via satellite. It is known to the system information about the crop cycle for C1 and the current Agri-season—say—rainy season—from June to September.

In the system disclosed herein, it is known that there are 'K' BEUs who have chosen to seed/grow/harvest crop C1, as well as it is known that the sowing time window is A to B for C1. Thus the system disclosed, using information display masking—distributes information visibility to the others—that is SEC/CMSC—for C1 for a set of K BEUs. Thus, the time window A to B is divided between K unit—to get uniform distribution. This thus impacts the supply/harvesting for C1 crop—and making it uniform for K BEUs and not lower the selling price for BEU by controlling the supply from BEU; by masking information displayed to SEC/CMSC.

Example: Suppose there is a requirement for crop C1 from CMSC and there are 100 BEU's ready to harvest at a given time window E-F (Example 10 days) (based on information validated by satellite sensors and remote sensing using hyperspectral imaging and user submission). The system will not show all 100 BEUs to the CMSC at one time. Instead, it will spread the information in time (across weeks or days), so each BEU gets the pricing benefit in the respective time window.

FLOOR(100/E−F)=FLOOR(100/10)=10 BEUs per week: to get a per week list of BEU's to be presented to the CMSC.

In the next week the subsequent BEUs are presented. This allows the spread of distribution between the BEUs harvesting (supply) and demand gap.

Further, contemporary designers of visual and interactive interfaces do not have dynamic structures for layout and rely on static structures for presentation of information. The display layout of the mobile phone is generally statically laid out by the designer. It also assumes a certain capability of the user such as education, understanding smartphone conceptually, skill level on using a smartphone, ability to interpret gestures (scroll right, left, up, down, pinch, zoom) to explore data and comprehend the information on it. The current art of visual-structuring display viewports and their layout is not informed by content optimization for a goal set by the user. That is, for a BEU set goals of value, the structural display of that information and exploring the data sets to enquire for that information and then automatically placing the information in that resized layout is not known. Since the layout of the information on the smartphone is generally done by the visual designer in tandem with the capabilities of the mobile window manager, the designer nor the machine can automatically layout for the BEU for a specified constraints of time and value. Hence one can expect that the current machine capabilities and those of the visual designer cannot provide a mechanism to address this problem.

Referring now to the drawings, and more particularly to FIGS. 1A through 10F, where similar reference characters denote corresponding features consistently throughout the figures, there are shown preferred embodiments and these embodiments are described in the context of the following exemplary system and/or method.

FIG. 1 depicts an architectural overview of a system 100 providing an interface layout on a mobile device to discover and optimize economics of information exchange of digitally virtualized physical space for the Basic Emergent User (BEU), in accordance with some embodiments of the present disclosure.

As depicted, the system 100 is spread across multiple tiers or planes.

A Non-Living Legal Plane (NLLP) is the set of Corporate Legal Entities who draft, execute, maintain, and ensure compliance to legal contracts between parties. This plane has entities which either do a part of the role singularly or as a team of entities. For example, one entity may do contract drafting while other entity in the NLLP ensures compliance.

A Contract Management System (CMS) Plane has entities which represent corporate entities (a plurality of CMSCs such as CMSC01, CMSC02 and so on) with perpetual rights and all rights that are bestowed on humans especially those of property rights and economic rights. One or more end users acting on behalf of these entities (CMSCs also referred to as CMS-CNs)) consume the services of the NLLP entities to take birth and give birth or absorb peer entities. These entities need humans (end users—U01, U02, etc.) on the subsequent plane to enact and execute the rights thus acquired from the NLLP by enrolling the humans into designated roles.

Profit of each CMS-CN is represented by (PCC plane) holds Repository of Filed Public records (FPR) that maintains Profit and Loss (P&L) of each entity corresponding to existing contract in the CMS Plane.

The CMS-U plane has human beings (end users—U01, U02, etc.) who have a legal contract with the entities in the CMS Plane. This legal contract allows them to act on behalf of the entities in the CMS Plane. Each entity in this plane can have one or more rights contractually bestowed but non-necessarily time invariant (can change with time, and term and conditions)

Profit of each SEC is represented by PSEC plane. The SEC Plane is a socio-economic-political cohort of BEU users. Each BEU entity using the services of one or more NLLP entity enters into a digital contract and becomes a member of the SEC entity. One BEU entity can be a member of one or more SEC entity. One or More BEU entities can draw a digital contract with the help of one or more NLLP entities to incorporate a SEC entity. All contracts drawn by one or any or more entities in this plane are recorded on a shared common ledger/blockchain (SL/BC). All the entities the BEUs, SECs and the CMSCs interact with each other through an application installed on individual mobile phones, e.g., the smart phones.

An Emergent User (EU) plane has one or more BEUs. Each BEU has a data, information and knowledge repository associated with a virtualized representation of physical asset holdings (PAH), for example, Plot Land (PL) as depicted in FIG. 1 of physical farms associated with/owned by the BEU. Data for such farm would imply, but not limited to, date and data of farm preparation, activity details, date, and data of farm operations such as breed or variety of crop, sowing, administering hormones, pesticide, insecticide, weedicide et cetera and activities pertaining to production of crop, latitude-longitude of crop, observations of the crop growth by human inspection, Drone or machine inspection, satellite data feeds, weather of the date, sensors recording the data of the plant and earth, water and nutrients. This data in an XML-DTD format tagged with the unique identifier of each BEU such as PAN number or AADHAR number is available in a repository in this plane. Each such Data Unit (DU) of 1 BEU is associated with one or more entities of SEC plane, CMS-CN Plane and this association is recorded on the SL/BC shared ledger.

A Reputation Risk (RR) Block is the Reputation Risk Component, which works along with the Blockchain/Shared common Ledger (BC-SL). For every Digital Contract (DC) registered on the SL/BC between SEC-BEU and/or SEC-CMSC or CMSCN-BEU the contract can result in a successful execution or a contested execution. For a success, a score of +1 is recorded and for a contested execution a score of −1 is recorded. Both the scores are different. That in contested one party can claim success and the other as failure. Both are recorded. If there is a concurrence of failure or success that is also recorded. The RR is computed as, where P is provider and C is consumer, RR=2 {SUCC::P, C}RR=0 {FAIL::P,C}, RR=0.25{FAIL:P}RR=0.5{FAIL: C}. The total RR of a P or C is the sum of scores across all contracts registered on the SL-BC. Each score is further weighted by the valuation of the contract with the weights been 1 for 1K and multiple, 2 for 1M and multiple, 4 for 1B and multiple. This score is used in the Structural Layout of the interface on the User {BEU, SEC, CMS-CN-U1} smartphone in the discovery phase on initial layout and layout updating on user gesture. Higher scores does not necessarily mean higher exposure since Newer entities {BEU, SEC, CMS} have lower scores. Higher scores are used to give chances to those who have had less opportunity to score and hence an exposure in the layout. However, having scored a score, one becomes eligible for the comparison in a Multi Arm Bandit (MAB) module. Multi-armed bandit (MAB) algorithms, well known in the art are designed to identify the best arm among several arms in an unknown environment. They guarantee optimal balance between exploration (select all arms sufficient number of times) and exploitation (select best arm as many times as possible). The goal of all entities is to have a larger positive score.

Physical Asset Holdings (PAH) refer to components which are physical spaces components such as agriculture land, which are then mapped to their digital virtual equivalents with associated data linkages and enabled for display on the smartphone.

Each individual mobile device has a BEU-MAB, SEC-MAB, CMSC-MAB) that are the MAB instances for respective BEU, SEC and CMSC entities. These MAB instances allows identification of SEC, CMSS for a specified value of G, T for a specified BEU. In the case of SEC-MAB, it allows identification of CMSC for a specified value of G,T.

Figure 2:
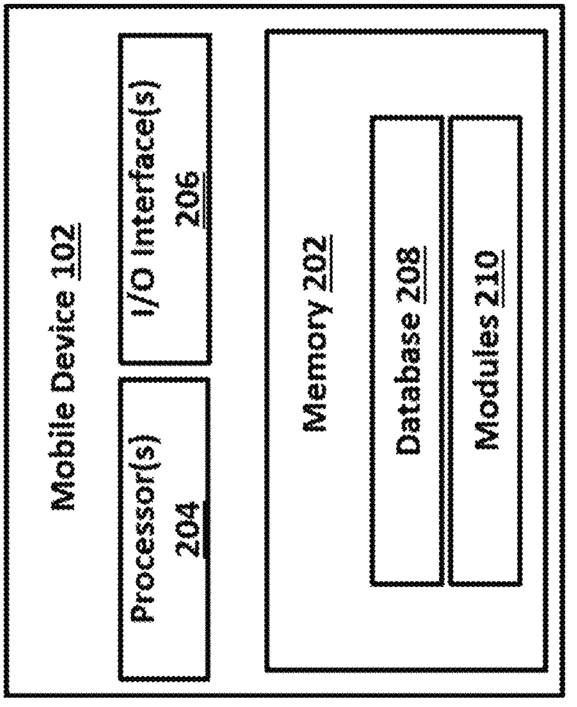
FIG. 2 is a functional diagram of each of the mobile devices of the system of FIG. 1 providing interface layout to discover and optimize economics of information exchange of digitally virtualized physical space for the Basic Emergent User (BEU), in accordance with some embodiments of the present disclosure.

FIG. 2 is a functional block diagram of a mobile device 102 in the system 100 providing the interface layout on the mobile device to discover and optimize economics of information exchange of digitally virtualized physical space for the Basic Emergent User (BEU), in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the mobile device 102.

Referring to the components of mobile device 102, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the mobile device 102 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110, for example the BEU-MAB module in mobile device 102, the SEC-MAB module in the mobile device 104 of the SEC and CMSC-MAB module in the mobile device at CMSC/CMS-CN end.

The plurality of modules 110 include programs or coded instructions that supplement applications or functions performed by the mobile device 102 for executing different steps involved in the process of providing an interface layout on a mobile device to discover and optimize economics of information exchange of digitally virtualized physical space for the Basic Emergent User (BEU), being performed by the mobile device 102. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure.

Further, the memory 102 includes a database 108. The database (or repository) 108 may include a plurality of abstracted pieces of code for refinement and data that is processed, received, or generated as a result of the execution of the plurality of modules in the module(s) 110.

Although the database 108 is shown internal to the mobile device, it will be noted that, the database 108 is also be implemented external to the mobile device 102 such as i) the Repository of Filed Public records (FPR) to determine if SEC/CMSC is profitable with financial solvency, and ii) the administrative database maintaining records of mobile number and associated linkage to physical asset holdings of the BEU. For example, a mobile number, which is linked to citizen ID and in turn linked to land record details of a person information of physical asset for the BEU can be retrieved using known technology.

This Repository of Filed Public record (FPR) is a collection of structured financial databases SFDB(N), where N is an index variable indication the databased among N databases of a CMSC. Example of SFDB is the India Stack API used by licensed account aggregators, OCEN {open credit enablement network} used for credit disbursement for BEU or SEC using identity data such as Permanent Account Number (PAN) associated with Income Tax, Goods and Service Tax Network (or GSTN) number associated with tax on Goods/services offered by CMSC, Aadhaar (unique Identification Number for a citizen in India), etc. Each SFDB contains publicly disclosed information about each entity CMSC. Examples of SFDB include (but not limited to) India Stack APIs (recording tax payments, input tax credit claims in real time), Annual Reports of CMSC(N), Data.Gov.in, Registrar Of Companies, BSE, NSE, SEBI. This database can be queried via a web API to get financial information in public domain pertaining to Profit & Loss on a temporal basis (example, Quarterly, Annually, Weekly). For each CMSC there is P(i), where P(i) is the payout it did to vendor SEC(i). For each P(i) we also have PR(N) which is the profit which CMSC earned for that time window. Similarly, we have a structure for each SEC(N) where PEU(i) is the payout it did to each EU(i) and PRSEC(N) is the profit earned by SEC(N) for that time window.

These external databases are communicatively coupled to the mobile device 102 (mobile device 104 and 106). The data contained within such an external database may be periodically updated. For example, new data may be added into the database (not shown in FIG. 1A) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the mobile device 102 are now explained with reference to steps in flow diagrams in FIG. 3 and drawings in FIGS. 4 to 10F.

Figure 3:
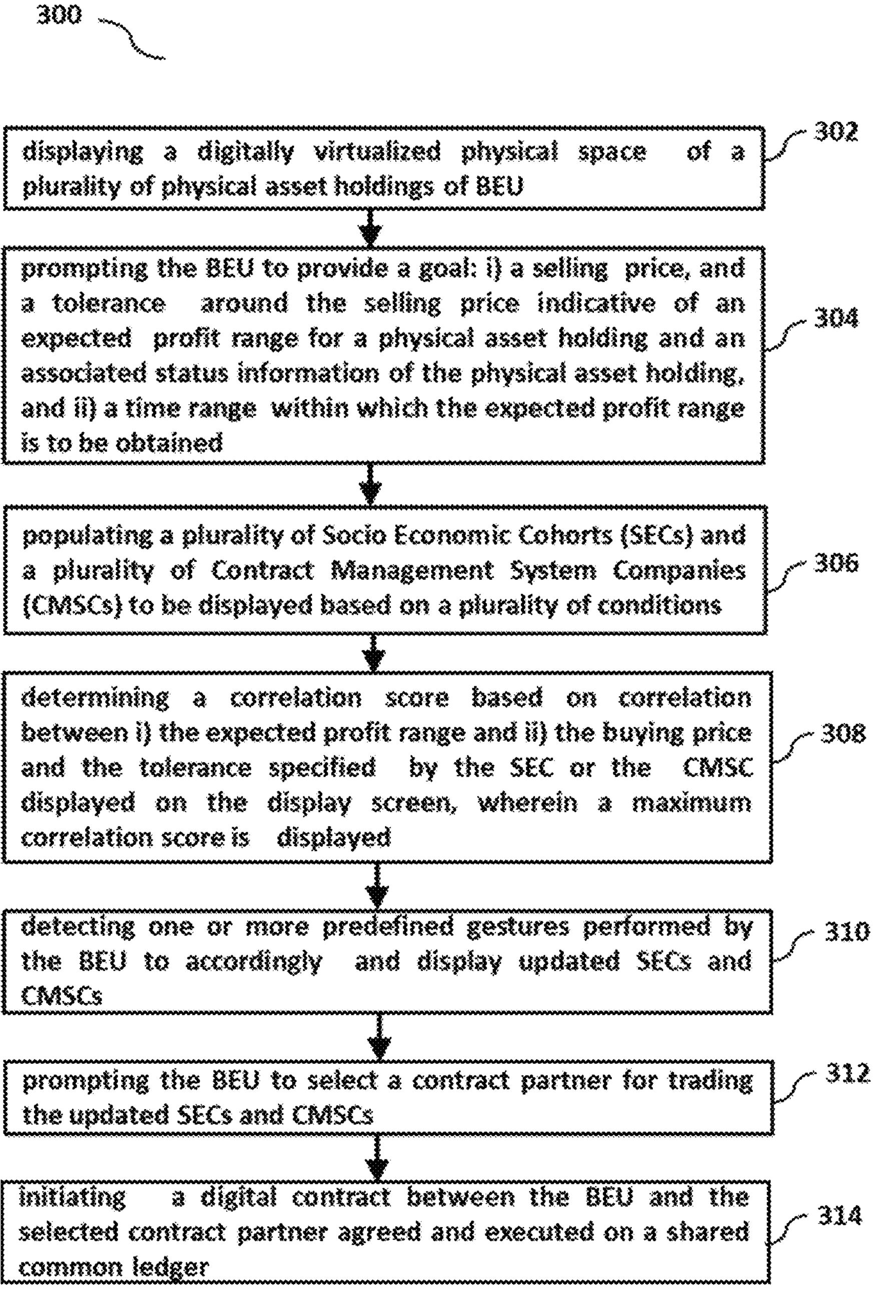
FIG. 3 is a flow diagram illustrating a method for providing interface layout to discover and optimize economics of information exchange of digitally virtualized physical space for the Basic Emergent User (BEU), using the system depicted in FIG. 1 and mobile device depicted in FIG. 2, in accordance with some embodiments of the present disclosure.

FIG. 3 is a flow diagram illustrating a method 300 for providing interface layout to discover and optimize economics of information exchange of digitally virtualized physical space for the Basic Emergent User (BEU), using the system depicted in FIG. 1 and mobile device 102 depicted in FIG. 2, in accordance with some embodiments of the present disclosure.

In an embodiment, the mobile device 102 comprises one or more data storage devices or the memory 202 operatively coupled to the processor(s) 204 and is configured to store instructions for execution of steps of the method 300 by the processor(s) or one or more hardware processors 104. The steps of the method 300 of the present disclosure will now be explained with reference to the components or blocks of the mobile device as depicted in FIG. 2, the steps of flow diagram as depicted in FIG. 3 through 10F. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Referring to the steps of the method 300, at step 302 of the method 300, the one or more hardware processors 204 are configured to display, by one or more hardware processors, a digitally virtualized physical space of a plurality of physical asset holdings, interchangeably referred to as PAH, of a Basic Emergent User (BEU) on a display screen of the mobile device 102 on detecting an activation event, wherein the digitally virtualized physical space for each of the plurality of physical asset holdings is associated with a geographical location validated by satellite sensors and remote sensing using hyperspectral imaging. The BEU communicates via an application (app) installed on the mobile device 102 of the BEU. The app, executed by the one or more hardware processors, when opened triggers the activation event and enables BEU to communicate with the app.

The digitally virtualized space as depicted in FIG. 1, for each of the physical asset holding is created by:

a) Acquiring a mobile contact number associated with mobile device by querying the mobile device for Subscriber Identity Module (SIM) information. This is performed using well known technology in the art.
b) Retrieving information associated with identity of the BEU using the acquired contact number from one or more databases such as administrative database (component of database 208) maintaining the land records as shown in FIG. 1.
c) Extracting information on the physical asset holding and the associated status information of the physical asset holding, associated geo location of the BEU from the retrieved information.
d) Generating the digitally virtualized space based on the extracted information for displaying on the display screen.

Figure 4:
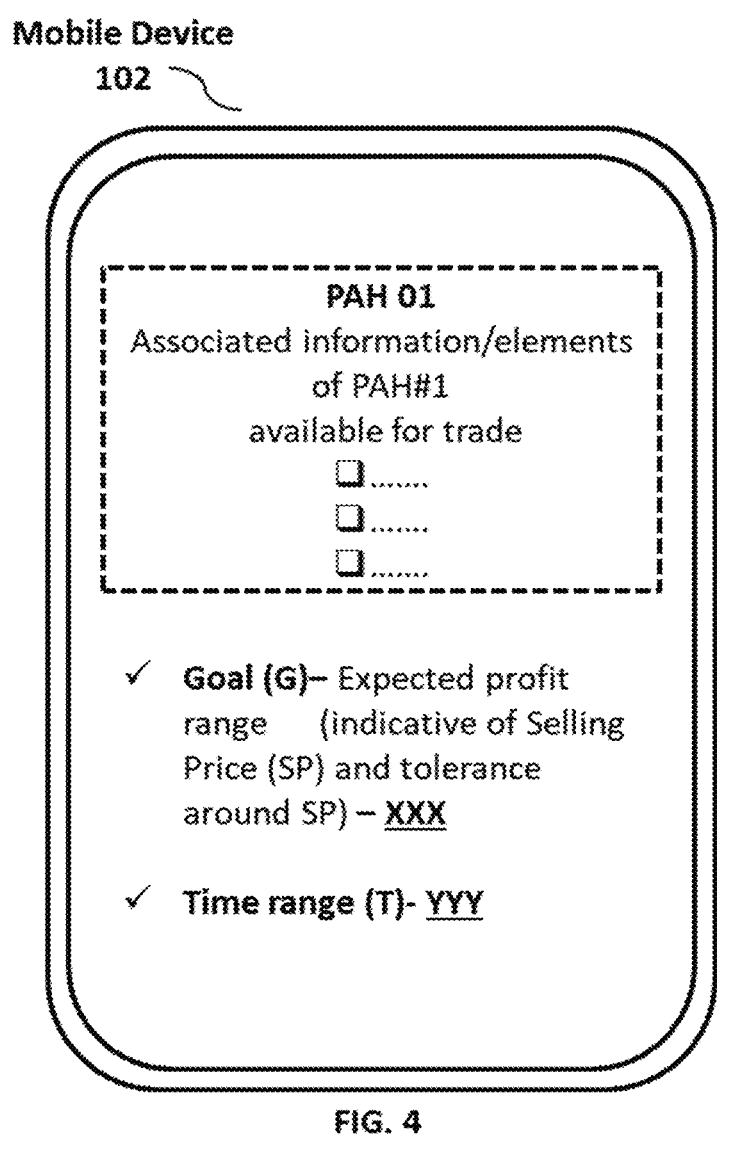

Once the digital virtualized spaces of PAHs owned by the BEU are displayed, then at step 304 of the method 300 and as depicted in FIG. 4, the one or more hardware processors 204 are configured to prompt the BEU to provide a goal (G) in terms of a tuple (P,T) comprising an expected profit range and an expected time range (T). The expected profit range is indicative of a selling price (SP), and a tolerance around SP for the physical asset holding among the plurality of physical asset holdings and an associated status information of the physical asset holding. The associated information, for example, can be the crop and its current stage such as ready to harvest etc. The time range (T) is indicative of time within which the expected profit range is to be obtained. For example, the significance of time range is understood with respect to agricultural produce, the crops that are perishable items and beyond the time range lose their value completely as they are of no use to the buyer. Thus, the method provides a time bound search for the objective to provide a profitable buyer.

The BEU selects the physical asset holding via the digitally virtualized physical space displayed on the display screen.

At step 306 of the method 300, the one or more hardware processors 204 are configured to populate a positive RR-scoring plurality of Socio Economic Cohorts (SECs) and the plurality of Contract Management System Companies (CMSCs) to be displayed on the display screen based on a plurality of conditions. As explained earlier as well, the RR score is a continuous computation process for each of the BEU, the SEC and the CMSC based the success and failure of the compliance to digital contract each time, wherein the RR score is incremented by '1' for every successful execution of the digital contract and is decremented by '1' for every contested execution. The increment and decrement by 1 is an exemplary value and fractional values such as 0.25, 0.5 can be used for incrementing and decrementing. The conditions to be satisfied by the SECs and CMSCs are as following:

a. The plurality of SECs and the plurality of CMSCs lie within a satellite based sensor ascertained geo-radius with the physical asset holding as a center, wherein the geo-radius is derived from the time range.

b. The plurality of SECs and the plurality of CMSCs satisfy a criteria of being profitable with financial solvency and a positive RR score, c. The plurality of SECs and the plurality of CMSCs is a mix of known, unknown, trusted, and untrusted SECs and CMSCs. The state diagrams of FIGS. 9A and 9B indicate the transition of an entity such as the SEC of CMSC into different stages. Initially when the BEU has never had any digital contract with an entity, it is unknown to the BEU. Once the trade goes ahead for the first time ever, the entity is now known to the user. Later if the digital contact is successful the entity becomes trusted entity while refereeing to it during later digital contracts. However, if the digital contract does not terminate successfully, the entity falls under the category of untrusted for the BEU. BEU may think twice while next time dealing with the untrusted entity. The unknown SECs and the unknown CMSCs are identified as the known SECs and known CMSCs when the digital contract is recorded with BEU. The known SECs and CMSCs are identified as trusted when the digital contract is executed successfully. The known SECs and CMSCs are identified as untrusted if the digital contract is not respected or contested, as claimed by either or any party of the digital contract.

The plurality of SECs and the plurality of CMSCs identified are those for which i) the expected profit range provided by BEU, which is indicative of selling price (SP) and the tolerance around the SP, and ii) a buying price and the tolerance specified by a SEC or a CMSC is within a predefined limit, such that it maximizes a BEU profit equation {MPTEU(k)+sqrt[2×LN(T)/r(k)}, discussed with help of example provided at step 308.

At step 308 of the method 300, the one or more hardware processors 204 are configured to determine a correlation score based on correlation between i) the expected profit range indicative of the selling price and the tolerance around the SP as provided by the BEU and ii) the buying price and the tolerance specified by the SEC or the CMSC displayed on the display screen.

Using the information of financial records from FPR of each on the SEC or CMSC, based on historical time series data, PT(i) is the mean profit earned by CMSC over the said time window, with a standard deviation of SD(i). Similarly, this construct can be replicated for each SEC(N), where PTSEC(j) is the mean profit earned by SEC(j) for that time window.

In summary, time series values for each CMS-C(i) and SEC(j) and BEU(k) (also referred as Emergent User K (EU(k))) for various time intervals TCMS(I), TSEC(m) and TEU(n) mapping to their profits (earnings and payouts) to PT(i), PTSEC(j) and PTEU(k).

Understanding the correlation score computation—logical flow of steps:

1. BEU provides Price×Time.
2. For each unit of time (minute) (till you reach Time), create a set of concentric circles with BEU village as center make a table with the columns as (unknown, SEC) (unknown CMSC) (trusted SEC) (trusted CMSC) (not-trusted SEC) (not-trusted CMSC), acronym as (US, UC, TS, TC, NS, NC respectively).
3. Specify a threshold of (unit of currency—1K, 100K)−1 (or 10 or 100 or 1000) for each inner concentric circle, pick a threshold value, say 1 (that is INR 1k) for this value of geo-radius, populate the row of (US, UC, TS, TC, NS, NC) if any one of the published contract values of (US, UC, TS, TC, NS, NC) satisfy the criteria that their Price minus BEU(Price) is within the threshold.

Along with this let IN(CMS-C, SEC, i, j, q) represents the interaction between CMS-C(i) and SEC(j) and q represents the frequency count of this interaction. Similarly, IN(SEC, EU, i, j, r) represents the interaction between SEC(i) and EU(j) and r is the frequency count of this interaction.

With this, MPT(i), MPTSEC(j) and MPTEU(k) represent the mean profits for a time (T, r) given by Sum(PT(i)) divided by r respectively for CMSC, SEC, EU set elements. Thus, over r interactions SEC(j) earned profits of PSEC(j) over a time T from a set of CMSC(n) where n<=N. The corresponding standard deviations are SDPT(i), SDPTSEC(j) and SDPTEU(k).

EU-PL-Tolerance: This value represents the tolerance (variation around expected profit, also referred to as expected profit range) the EU/BEU is ready to accept as a variation(less) from the maximum possible realizable gain (profit). The maximum possible gain is an average of the past 5 years of a particular CMS-C(i), automatically fetched from the SFDB(i) and rationalized by a Human Expert. Each EU on launch of the app, picks a value for herself/himself for a validity period of a specified time-window example kharif season or rabi season in agriculture, Diwali season in retail, etc.

Thus, let GLCMS-C(i) GLSEC(j) and GLEU(k) respectively represent the Gain Loss tolerance (expected profit range) values which CMS-C(i), SEC(j) and EU(k) choose.

Personalized Layout

Referring to FIG. 1, a visual layout of the set physical asset holdings (PAHs), for example, the plot Lands (PLs) of $i^{th}$ BEU are depicted, wherein PL (N) {1<=N<=4} of the EU(i). Given a particular set of PL(N) the actual location is defined based on the product of probability of MAB (PL{N})×Probability of Location(4/3/2/1). Thus, the physiology of the user having a higher probability Location (POL)(1) {top left corner} then the lower probability location POL(4) {bottom right} for a right handed user. Similarly for POL(2), POL(3). Thus, the physiological probability is used to influence the probability of the user choosing the value recommended by MAB(PL{N}).

Maximizing the gains of EU by auto-layout of the PL(N) into Structural Layouts: The core challenge is that EU is unable to make choices which are economically beneficial to the EU given the vast number of choices presented to the EU. Also, the information required to make these choices is in distributed and disparate data sources which are not easily available or comprehensible to the EU. Ergo, the EU today makes sub-optimal choices. Using the EU-MAB method, the grid layout of the EU app screen is decomposed into a grid each corresponding to SEC(N) such that the decompose Grid method halts when the grid size reduces below 24 pixels square which is the physiological constraint imposed by tip of finger. The candidate set for SEC(N) is itself selected from the MAB method applied SEC-MAB.

Thus, the method structures layout on the EU smartphone (mobile device 102) such that {MPTEU(k)+sqrt[2×LN(T)/r(k)} is maximized.

That is, EU(i) will iteratively data loan or asset loan PL(z) to all the elements of SEC(j) such that over a time T, Sum of PTEU(i) for all PL(z) under EU(i) is maximized.

Since One of the core components of any Design is Balance, it is achieved by r{k}. That is, for a given PL(z) for a given PL(i), the BEU-MAB (mobile device 102) encourages that EU(i) engage with SEC(k) which has a lower interaction/repeat engagement as a compared SEC(I) which has higher interaction/repeat engagement, enabling BEU to explore Thus, dominance or local maxima of PEU(i) due to a singular SEC(k) is avoided. This also builds resilience into the sourcing of PTEU(i) since the value is now contributed to by other elements such as SEC(I). This is one of the unique features offered to the BEU by the method disclosed.

An illustrative example below explains the correlation computation.

The BEU provides (profit range and profit tolerance) {PREU(i), SDPREU(i)}, and similarly, time range and time tolerance{TEU(i), SDTEU(i)} as depicted and happens to interact with say CMSCs (A), Sanjay (B) and Della (D) during each digital contract interaction Anamika as depicted in Table 1 below, such that each entity has a positive RR Score.

Similarly, other entities such as the CMSCs and the SECs also have their defined profit range and time range (time limit).

TABLE 1

| | Frequency of Interaction with CMSCs | | |
|---|---|---|---|
| | Anamika (A) | Sanjay (S) | Della (D) |
| day 1 | 0.01 | 6 | 7 |
| day 2 | 1 | 6 | 7 |
| day 3 | 2 | 6 | 7 |
| day 4 | 3 | 6 | 7 |
| day 5 | 4 | 6 | 7 |
| day 6 | 5 | 6 | 7 |
| day 7 | 6 | 6 | 7 |
| day 8 | 6 | 7 | 7 |
| day 9 | 7 | 7 | 7 |

Choice made by the BEU/EU based on the recommendation in each interaction

TABLE 2

| | Recommended Interaction by the mobile device 102 to the BEU | | |
|---|---|---|---|
| | Anamika | Sanjay | Della |
| day 1 | 100 | 0.166666667 | 0.142857143 |
| day 2 | 1 | 0.166666667 | 0.142857143 |
| day 3 | 0.5 | 0.166666667 | 0.142857143 |
| day 4 | 0.333333333 | 0.166666667 | 0.142857143 |
| day 5 | 0.25 | 0.166666667 | 0.142857143 |
| day 6 | 0.2 | 0.166666667 | 0.142857143 |
| day 7 | 0.166666667 | 0.166666667 | 0.142857143 |
| day 8 | 0.166666667 | 0.142857143 | 0.142857143 |
| day 9 | 0.142857143 | 0.142857143 | 0.142857143 |

This will give index in the loop, and it is the non-sequential index.

TABLE 3

| Season Time (Hours) | 1 Year or 2 Year window Log of Time |
|---|---|
| 100000 | 11.51292546 |
| 200000 | 12.20607265 |
| 300000 | 12.61153775 |
| 400000 | 12.89921983 |
| 500000 | 13.12236338 |
| 600000 | 13.30468493 |
| 700000 | 13.45883561 |
| 800000 | 13.59236701 |
| 900000 | 13.71015004 |

The time component depicted in Table 3 extends from months, when we consider the Agri-climatic scale to hours when contracts are struck between various entities. Hence to normalize the time scale, the Agri-climate scale, to the 24 hour scale, we have used the logarithmic operation. As the table below shows, time scale across seasons running into thousands of hours is now mapped into a 24 hour scale. This helps in computations involving time in our system and gives a usable value for the numerical calculations.

TABLE 4

| M × N Buying Price (BP) Matrix | | |
|---|---|---|
| BP(A) | BP(S) | BP(D) |
| 95 | 110 | 85 |

TABLE 5

| M × N Profit (PR) Matrix | | |
|---|---|---|
| PR(A) | PR(S) | PR(D) |
| −10<br>0 | 5 | −20 |

TABLE 6

| EU Selling Price = 105 | Tolerance = 5 | | |
|---|---|---|---|
| | GL(A) | GL(S) | GL(D) |
| | 5 | | |

Thus, in the 'match making' operation, the mobile device 102 (BEU-MAB) picks and populates a Set (the one which gets displayed on screen)—where the { SP, Tolerance} and {BP, GL} are within the specified limits set by the Users {EU, SEC, CMSC}—wherein the each of the Users/Entities has been selected such that the BEU profit equation {MPTEU(k)+sqrt[2×LN(T)/r(k)} is maximized for a particular entity.

So, the BEU-MAB (mobile device 102) shortlists Anamika (CMSC) for the BEU with maximum correlation score. As can be extended, there is a set of such Anamika's A(i). Thus, a set of PrA(i) are there for all such A(i). Thus, for a given PEU(i)—the correlation score can be computed between the value set by the BEU-PREU(i) and PRA(j)—which gets displayed in the center of the screen. So, in terms of display, as the mobile device 102 is dynamically updating the calculations at a certain set frequency T, the live values keep getting displayed.

As can be seen, for a given value of PREU(i), a set of correlation values are there for each of PRA(j)—on the screen—out of the set of A(j)—one is generally shown highlighted—by convention—as the default selection—the one with highest correlation score—the central display—is shown for this particular value of j=F—that is correlation for A(j=F). As the BEU swipes—changes focus—then another value of j=S is highlighted, and the central display shows the score for this PrA(j=S).

Figure 5:
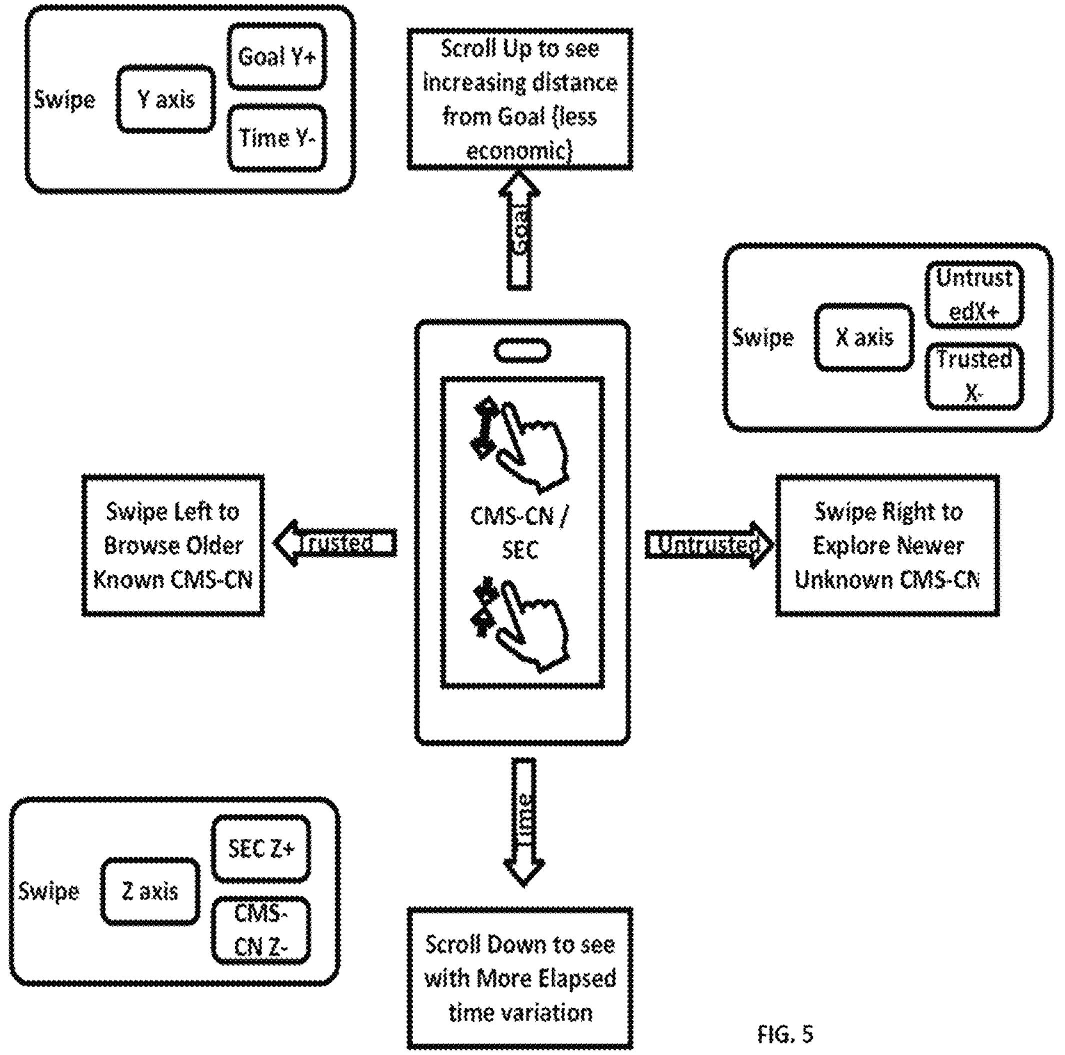
FIG. 5 depicts a plurality of gestures enabling exploration of new SECs and CMSCs in multiple dimensions, in accordance with some embodiments of the present disclosure.
Figure 6A:
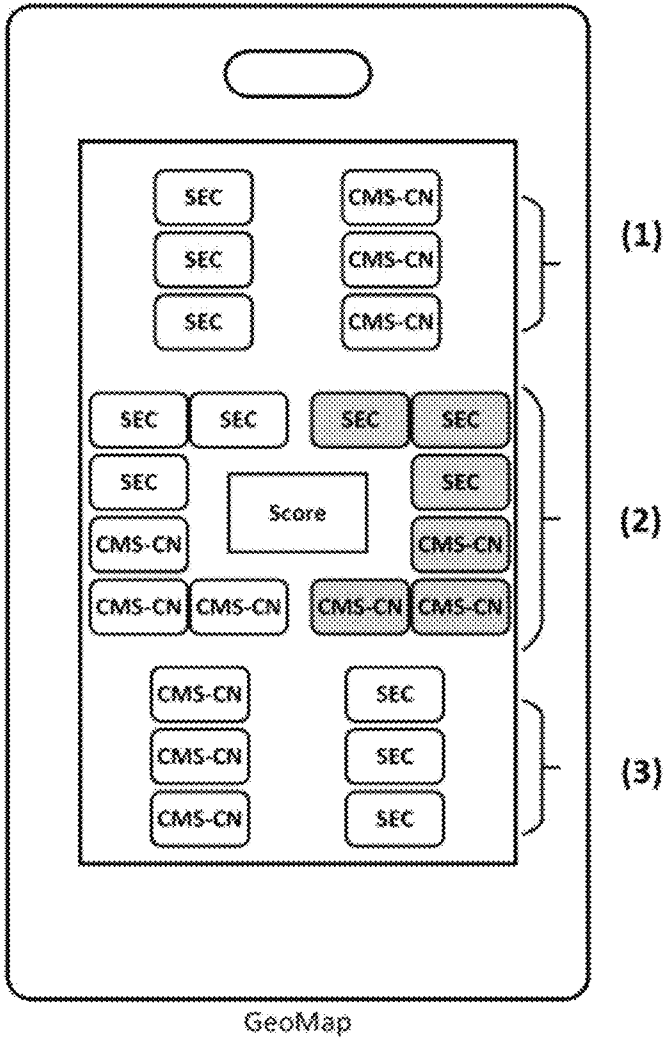
FIGS. 6A through 7C depict layout of newly explored SECs and CMSCs displayed in accordance with the plurality of gestures, in accordance with some embodiments of the present disclosure.

A maximum correlation score, as depicted in FIG. 6A is displayed on the display screen of the mobile device 102, and the SEC or the CMSC associated with the maximum correlation score is highlighted to the BEU. The positioning of the display in sequence from the unknown, the known, the trusted and the untrusted SECs and CMSCs on the display screen follows a most accessible screen space to least accessible screen space approach that drives the BEU to explore the unknown. The display of appropriate SECs and CMSC and further discovery of them based on plurality of gestures performed by the BEU on the screen are explained in conjunction to FIGS. 5 through 10F.

At step 310 of the method 300, the one or more hardware processors 204 are configured to detect one or more predefined gestures performed by the BEU to accordingly explore the plurality of SECs and the plurality CMSCs to be displayed on the display screen. In accordance with the one or more predefined gestures the display updates the maximum correlation score based on an updated plurality of SECs and an updated plurality of CMSCs displayed on the display screen. The BEU has the option to terminate the exploration when an intended maximum correlation score is displayed.

At step 312 of the method 300, the one or more hardware processors 204 are configured to prompt the BEU to select a contract partner for trading of at least one of i) the physical asset holding and ii) the associated status information of the physical asset holding from the updated plurality of SECs and the updated plurality of CMSCs.

At step 314 of the method 300, the one or more hardware processors 204 are configured to initiate a digital contract between the BEU and the selected contract partner, wherein the digital contract is recorded on detecting a predefined confirmation gesture on the display screen. The digital contract is agreed and executed on the shared common ledger depicted in FIG. 1, and wherein the digital contract enables direct trading of at least one of i) the physical asset holding, and ii) the associated status information of the physical asset holding.

Figure 6B:
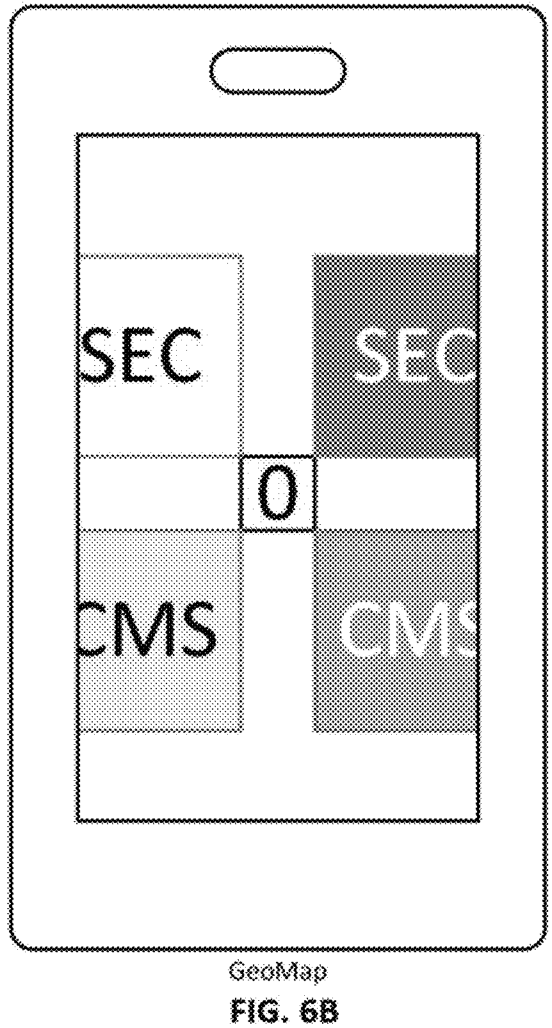

A first type of a default display mode arranges each of the plurality of SECs and the plurality of CMSCs from center of the display screen in accordance with descending order of the correlation score indicating a proximity of a SEC and a CMSC to the goal using a recursive display approach as depicted in FIGS. 6A and 6B. The SEC and the CMSC are segregated on the screen space based on the known and the unknown SECs and CMSCs. A unique usable color coding is displayed to differentiate the known and the unknown, the SECs and the CMSCs.

As depicted in FIG. 5 the one or more plurality of gestures defined for the first type of the default display mode comprises:

a. Pinch-zoom to navigate panning positive and negative Z-axis, wherein a pinch gesture displays only the plurality of SECs, and a zoom gesture displays only the plurality—of CMSCs.
b. Swipe left-right panning positive and negative X-axis, wherein a swipe left gesture displays only the plurality of SECs and a swipe right gesture displays only the plurality of CMSCs.
c. Swipe up-down panning positive and negative Y-axis, wherein a swipe up gesture displays only the plurality of SECs and a swipe down gesture displays only the plurality of CMSCs.

FIG. 6A depicts elements in X and Y axis with Z axis initialized to 0. The upper region FIG. 6A(1), wherein swiping in left direction (X−) yields more SEC elements and swiping in right direction (X+) yields more CMSC elements. The central region FIG. 6A(2), wherein swiping in upward direction (Y+) yields more SEC elements and swiping in downward direction (X−) yields more CMSC elements. The lower region FIG. 6A(3), wherein swiping in left direction (X−) yields more CMSC elements and swiping in right direction (X+) yields more SEC elements.

FIG. 6B depicts a closer look of the displayed SEC and CMSCs around the score.

Figure 7A:
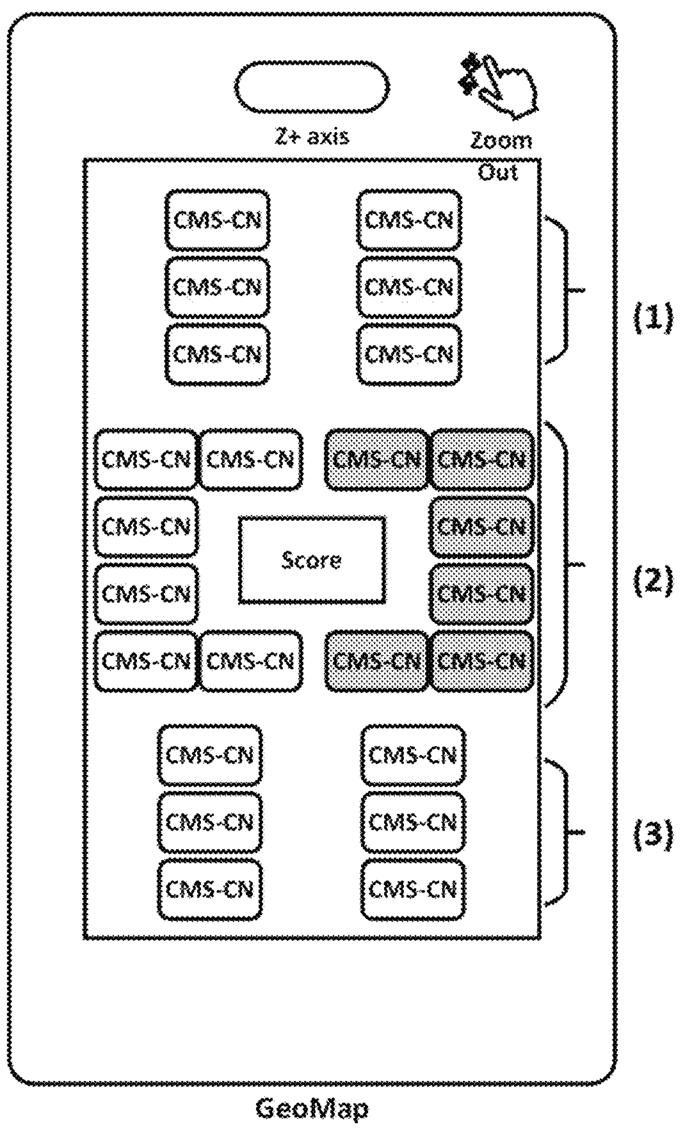
Figure 7B:
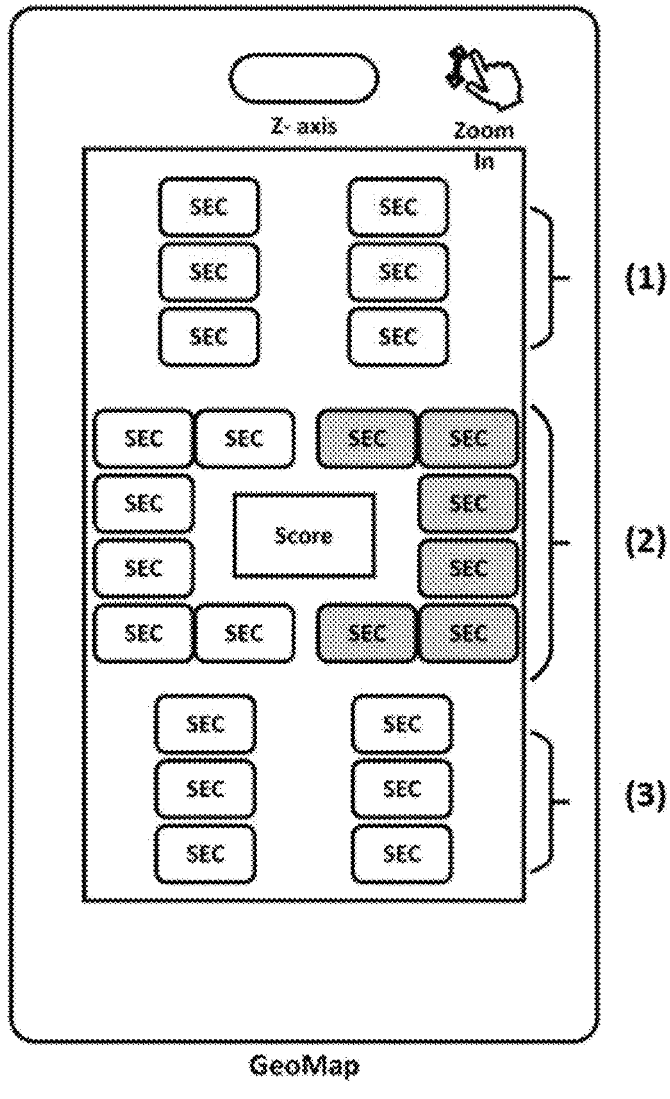
Figure 7C:
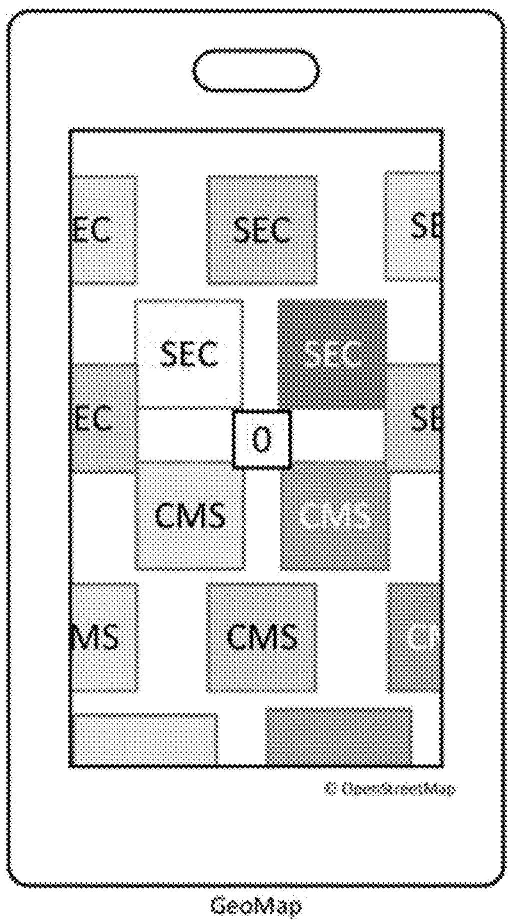

FIG. 7A, 7B and FIG. 7C depicts the Z-axis gestures of zoom out and zoom in respectively. The significance of zoom in and zoom out is that it varies the geographical radius considered to identify SEC and CMSC element in that region. Thus, based on the region been searched, zoom in or zoom out will be required to display the SEC and CMSC elements in that geo radius. This zoom value for searching SECs in state of Goa (smaller area) and state of Rajasthan (area multiple folds of Goa state area) in India will be entirely different as the area of the state differs widely.

A second type of a default display mode arranges each of the plurality of SECs and the plurality of CMSCs from center of the display screen in accordance with a paper windmill visual design approach as depicted in FIG. 10A to 10F.

Figure 8:
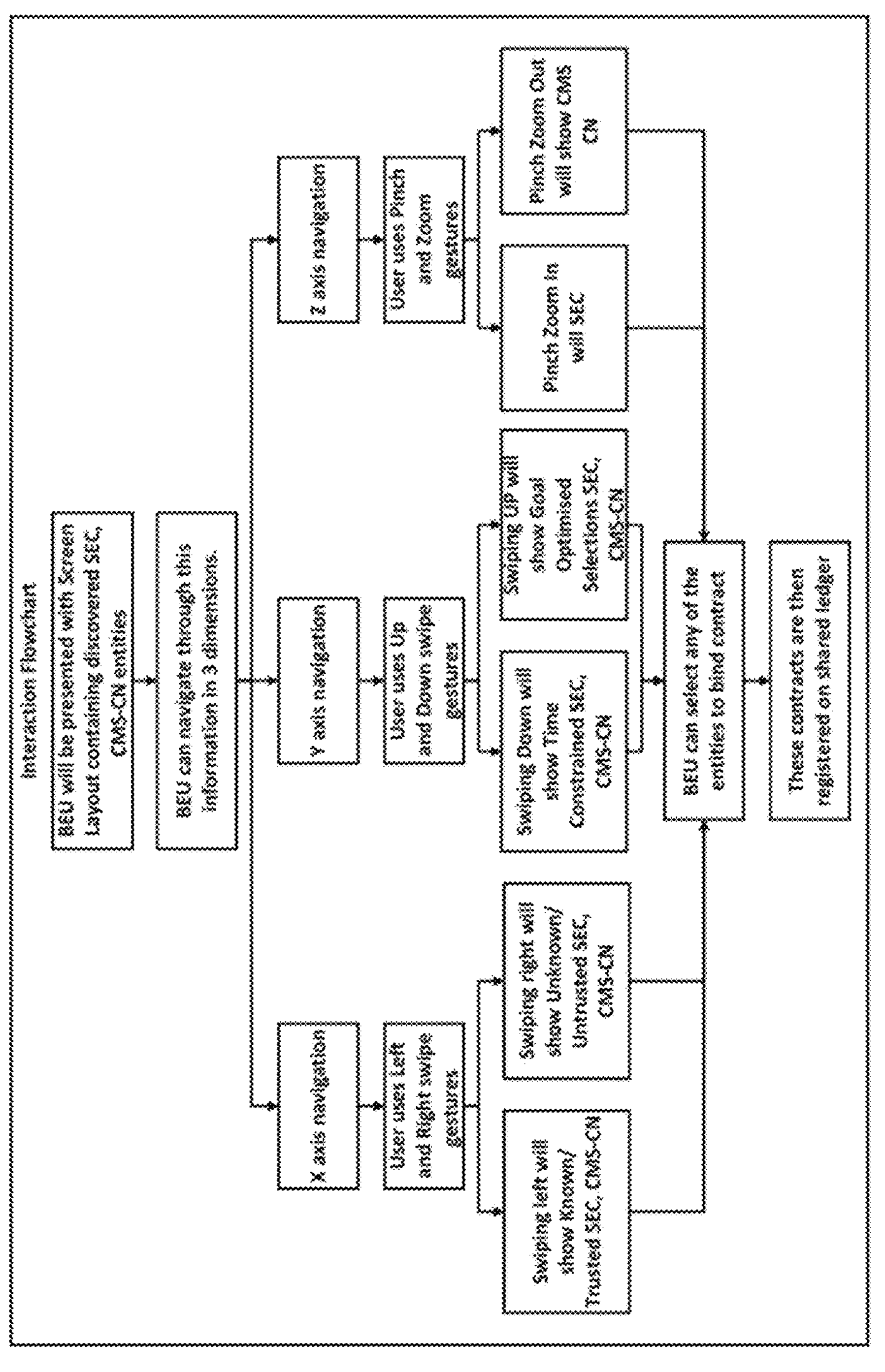
FIG. 8 is a process flow associated with plurality of gestures performed by the BEU, in accordance with some embodiments of the present disclosure.
Figure 9B:
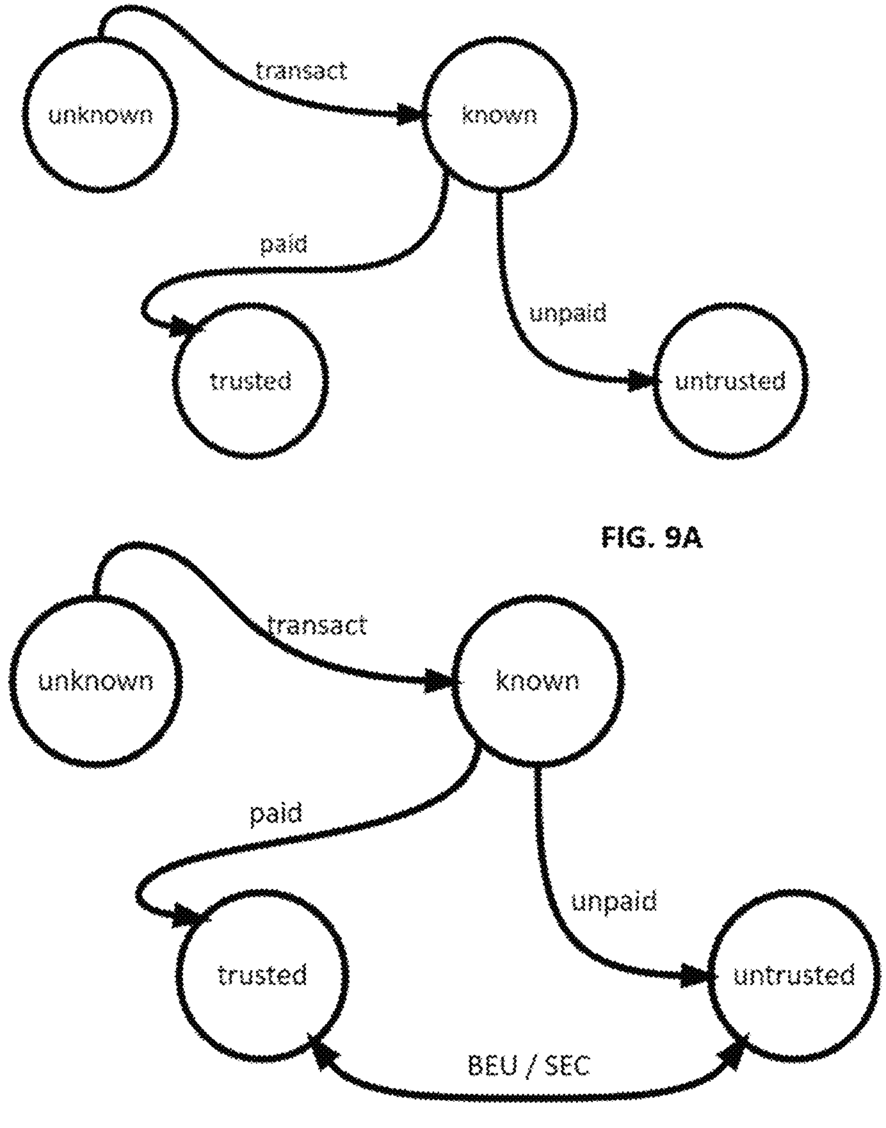

FIG. 8 depicts an overall process flow of the method 300 as explained in steps 302 to 314.

FIGS. 10A to 10F depicts discovered SECs and CMSCs displayed in accordance with the paper windmill visual design approach, in accordance with some embodiments of the present disclosure.

Figures 10A, 10B, 10C:
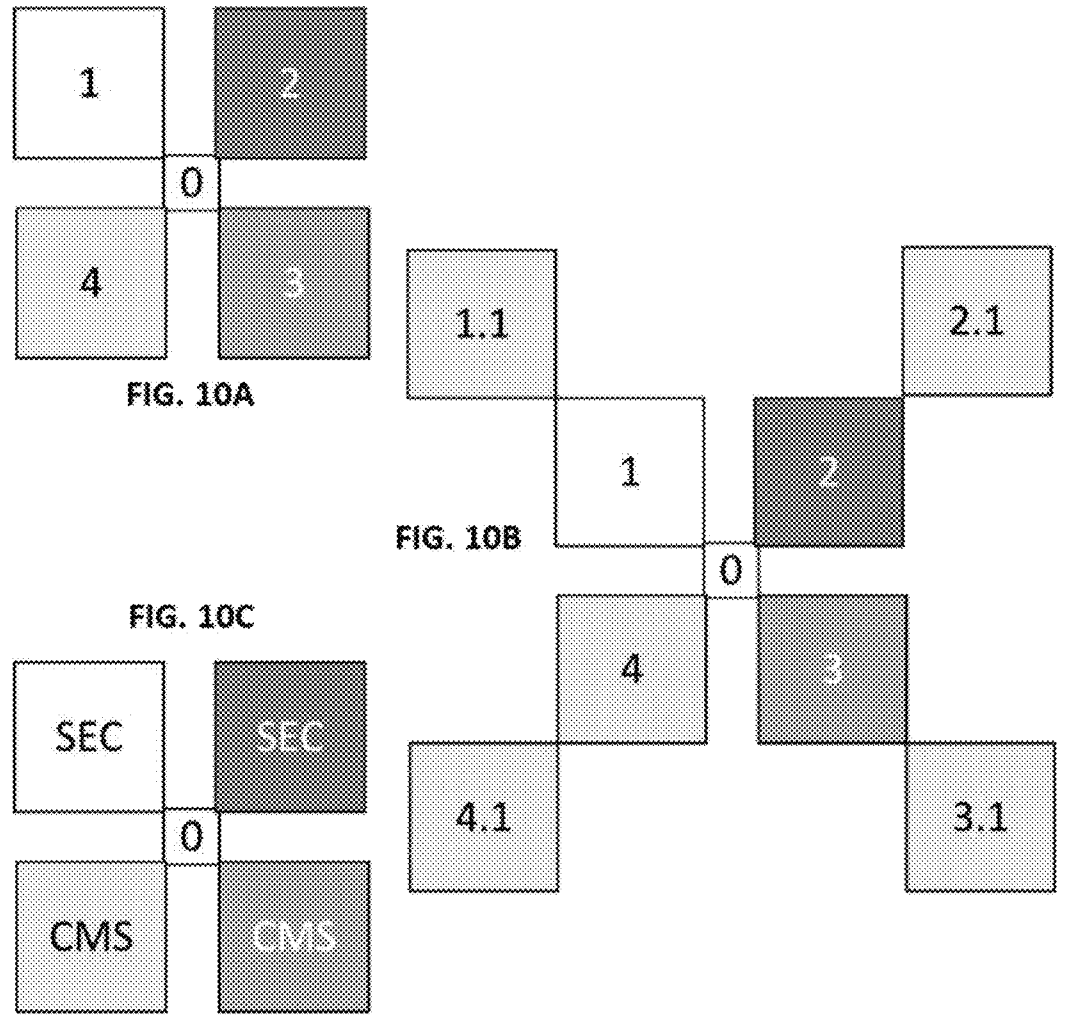
FIGS. 10A to 10F depicts discovered SECs and CMSCs displayed in accordance with a paper windmill visual design approach, in accordance with some embodiments of the present disclosure.

The layout provided by the paper windmill visual design approach disclosed herein is similar to a windmill and explained below Entities (SECs and CMSCs) are positioned in clockwise direction starting from pinhole. (1, 2, 3, 4 are positioned around 0). Nearest SEC with max profit is given location1, second best as 2 and so on. As the gestures are done on phone, other entities move into viewport Upon selecting an entity, it recursively expands sub-entities. (entity at position 2 in FIG. 10A when selected expands into 2.1 as depicted in FIG. 10B). FIG. 10C, depicts the actual display on mobile device 102 with SEC and CMSC replacing the nodes 1, 2, 3 and 4.

Figure 10D:
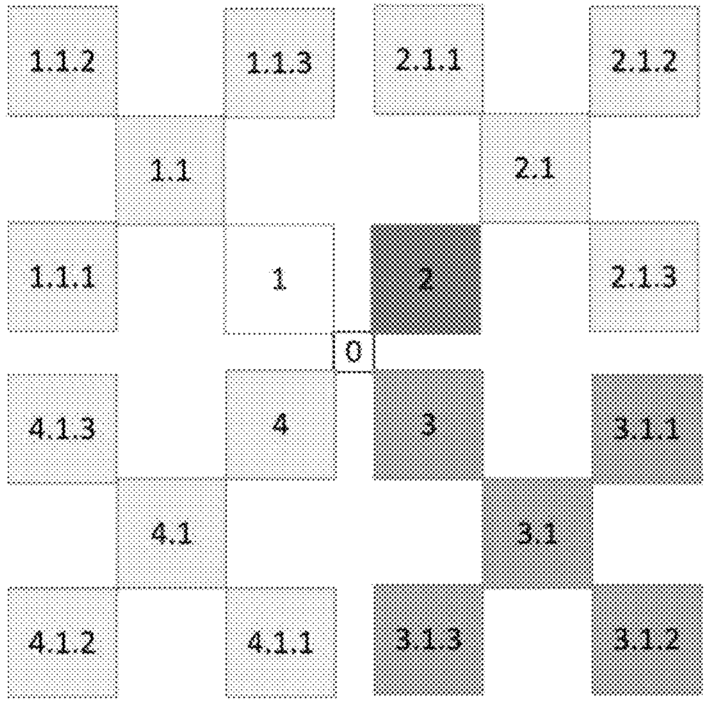

Sub-entities are positioned on the empty corners of the selected entity in a clockwise direction. (2.1 expands into 2.1.1, 2.1.2, and 2.1.3) as depicted in FIG. 10D.

Figure 10E:
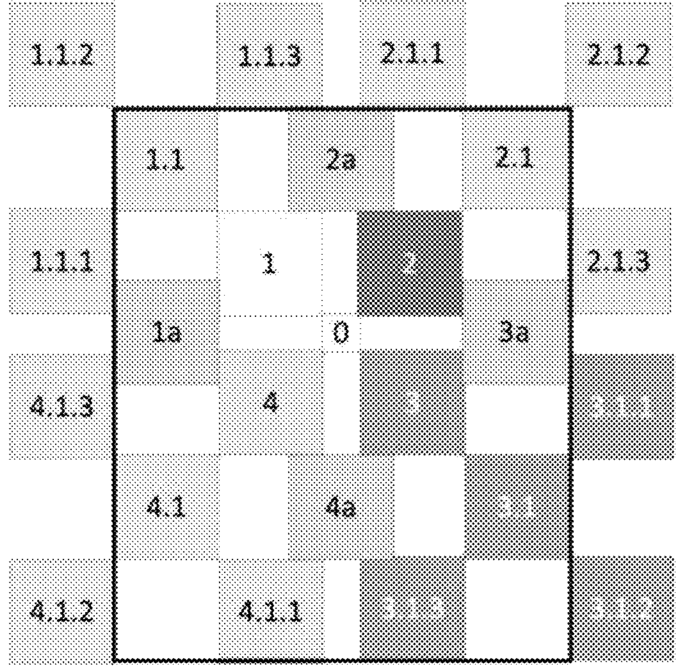
Figure 10F:
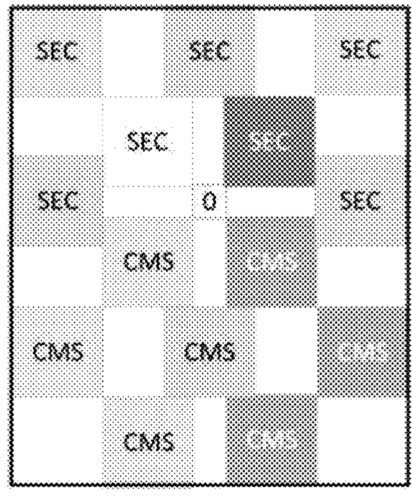

When a sub-entity is not placed on the corner, it is labelled as 1a, 2a, 2b etc. Ideally in clockwise direction, 2's child 2.1 should have been placed on left-top corner of 2. But since that same region may also be shared with 1's sub-entity 1.2 had it existed. Thus, there is an overlap in the visible layout. This overlap is substituted with a new node using alphabet labelling, which is placed equidistantly with the other sub-entity nodes of nodes 1 and 2, and it is called 2a. The alphabet labelling runs in the opposite direction of digit labelling, thus 1a will appear near sub entity of 4. Same is depicted in FIG. 10E. Further, FIG. 10F depicts SEC and CMSCs replacing the numeral nodes in FIG. 10E In the beginning, 0 is in the dead center of the screen.

Anticlockwise: Anticlockwise swipes will affect the upper half of the screen region. Circular Anticlockwise Fast swipe gesture (SEC—Sampling Fast) navigate with large step size of index. (Stepping at a pace 1, 1.1.3, 1.3.2). Circular Anticlockwise Slow swipe gesture (SEC—Sampling Slow) navigate with small step size of index, (Stepping at a pace 1, 1.1, 1.2)

Clockwise: Clockwise swipes will affect the lower half of the screen region. Circular Clockwise Fast (CMS—Sampling Fast) navigate with large step size of index. Circular Clockwise Slow (CMS—Sampling Slow) navigate with slow step size of index.

Thus, with reference to the above explanation, the one or more plurality of gestures defined for the second type of the default display mode (paper wind mill visual design approach) is summarized below:

a) A Circular Anticlockwise fast gesture provides fast sampling of the plurality of the SECs.
b) A Circular Anticlockwise slow gesture provides slow sampling of the plurality of the SECs.
c) A Circular Clockwise fast gesture provides fast sampling of the plurality of the CMSCs.
d) A Circular Clockwise slow gesture provides slow sampling of the plurality of the CMSCs.

The plurality of SECs and the plurality of CMSCs have the app installed on respective devices and respond to the digital contract initiated by the BEU. The plurality of SECs and the plurality of CMSCs utilize services of the Non-Living Legal Plane (NLLP) as depicted in FIG. 1 for offering trading pertaining to at least one of i) the physical asset holding and ii) the associated status information of the physical asset holding of a plurality of BEUs. Further, the SEC having the digital contract with the BEU utilizes the app to explore the plurality of CMSCs, select one CMSC and initiate and record a digital contract with the CMSC.

To provide an entire end to end working of the system 100 with reference to FIG. 1 depicting interconnect among each of the planes and entities within respective planes provided below are sequential steps performed at the mobile device 102, 104 and 106 at each of the BEU, SEC and CMSC end.

Mobile Device 102 (BEU)

1) Digitally virtualized physical space, for example: Agricultural Plot, Rooms in an Apartment
2) Collate information generation sources in a repository for each BEU.
3) Default layout at initial stage as per quantum of information per generating source multiplied by weights given by BEU.
4) Based on nearest Lat/Long positioning BEU can become a member of SEC, based on Z axis traversal as shown in Visual Layout of FIGS. 7A, 7B and 7C.
5) BEU can set Goal and Time as in FIG. 4. This auto-initiates layout manager.
6) This triggers BEU-MAB module/processor
7) BEU-MAB module looks at digital records in Repository of FPR from CMS-CN and discovers trusted/untrusted and known/unknown
8) Prepare a candidate list of all CMS-CN with values from trusted/untrusted and known/unknown and populate based on the past transaction history of BEU and RPFR and RR score
9) Populate this information in layout manager
10) Display adaptive dynamic layout to BEU
11) Initiate digital contract with CMS-CN
12) Record the contract on shared ledger (BC/SL)
13) Compute the reputation risk of CMS-CN.
14) Update the shared ledger with Reputation Risk value of CMS-CN
15) Loop back to Step. 6

Mobile Device 104 (SEC)

1) SEC uses the services of NLLP to incorporate itself.
2) SEC connects with BEU to make him a member
3) BEU and SEC register their digital contract on the ledger.
4) Update RPFR
   4.a.1 Compute the reputation risk of BEU or CMS-CN.
   4.a.2 Update the shared ledger with Reputation Risk value of BEU or CMS-CN
   4.b.1 SEC sets Goal and Time. This auto-s layout manager.
   4.b.2 This triggers SEC-MAB module/processor
   4.b.3 MAB processor looks at digital records in RPFR from CMS-CN and discover trusted/untrusted and known/unknown
   4.b.4 Prepare a candidate list of all CMS-CN with values from trusted/untrusted and known/unknown and populate based on the past transaction history of SEC and RPFR
   4.b.5 Populate this information in layout manager
   4.b.6 Display adaptive dynamic layout to SEC
   4.b.7 Initiate digital contract with CMS-CN
   4.b.8 Record the contract on shared ledger
   4.b.9 Compute the reputation risk of CMS-CN.
   4.b.10 Update the shared ledger with Reputation Risk value of CMS-CN
   4.b.11 Loop back to Step 4.b.2

Mobile Device 106 (CMSC/CMS-CN)

1) CMS-CN uses the services of NLLP to incorporate itself.
   1.a.1 CMS-CN will connect with BEU to make it a supplier.
   1.a.2 CMS-CN and BEU will register their digital contract on the ledger.
   1.a.3 Jump to Step 4
2) CMS-CN connects with SEC to make it a supplier.
3) CMS-CN and SEC registers their digital contract on the ledger.
4) Update Repository of FPR
5) Compute the reputation risk of SEC or BEU.
6) Update the shared ledger with Reputation Risk value of SEC or BEU It is to be noted that even though the method disclosed, describes the interface layout to discover and optimize economics of information exchange of digitally virtualized physical space for the BEU with agricultural land or plot as example of the physical asset holding (PAH), the PAH can be any physical asset capable of participation in information exchange as explained above. For example, a terrace of a building or a wall of the building that can host an advertisement hoarding, wherein the owner of the wall or the terrace can get monetary benefit by renting the space located at a specific geographical location, wherein the area, the elevation of the available space can be the associated information entered by the owner. The information and the space together is significant to decide a hoarding spot for an ad agency.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

displaying, by one or more hardware processors of a mobile device, a digitally virtualized physical space of a plurality of physical asset holdings of a Basic Emergent User (BEU) on a display screen of the mobile device on detecting an activation event, wherein the digitally virtualized physical space for each of the plurality of physical asset holdings is associated with a geographical location validated by satellite sensors and remote sensing using hyperspectral imaging, wherein the activation event is triggered upon opening an application installed on the mobile device of the BEU;

prompting, by the one or more hardware processors of the mobile device, the BEU to provide a goal in terms of a tuple comprising i) an expected profit range, indicative of selling price and a tolerance around the selling price, for a physical asset holding among the plurality of physical asset holdings and an associated status information of the physical asset holding, and ii) a time range within which the expected profit range is to be obtained, wherein the BEU selects the physical asset holding via the digitally virtualized physical space displayed on the display screen;

populating, by the one or more hardware processors of the mobile device, a plurality of Socio Economic Cohorts (SECs) and a plurality of Contract Management System Companies (CMSCs) having a positive Reputation Risk (RR) score to be displayed on the display screen based on a plurality of conditions comprising:

the plurality of SECs and the plurality of CMSCs lie within a satellite based sensor ascertained geo-radius with the physical asset holding as a center, wherein the geo-radius is derived from the time range, the plurality of SECs and the plurality of CMSCs satisfy a criteria of being profitable with financial solvency and the positive RR score, the plurality of SECs and the plurality of CMSCs is a mix of known, unknown, trusted, and untrusted SECs and CMSCs, wherein the known, the unknown, the trusted, and the untrusted SECs and CMSCs are discovered by querying and looking at digital records in a repository of Filed Public records (FPR) from CMSCs, and the repository of the FPR is internal or external to the mobile device and the repository of the FPR is periodically updated, and the plurality of SECs and the plurality of CMSCs for which the selling price and the tolerance provided by the BEU and a buying price and the tolerance specified by a SEC or a CMSC is within a predefined limit to maximize a BEU profit equation, wherein the plurality of SECs and the plurality of CMSCs are displayed at zones having a higher probability compared to other zones on the display screen of the mobile device via a layout manager, wherein the RR score is a continuous computation process for each of the BEU, the SEC and the CMSC based the success and failure of the digital contract each time, and the RR score is used in a structural layout of an interface on mobile devices of the BEU, the SEC, the CMSC in a discovery phase on initial layout and layout updating on a user gesture, and wherein the layout manager is controlled by a multi-armed bandit algorithm assigning exposure weights to a plurality of entities based on an optimal exploration-exploitation balance and the RR score;

determining, by the one or more hardware processors of the mobile device, a correlation score based on correlation between i) the expected profit range indicative of the selling price and the tolerance around the selling price, provided by the BEU and ii) the buying price and the tolerance specified by the SEC or the CMSC displayed on the display screen, wherein a maximum correlation score is displayed on the display screen and the SEC or the CMSC associated with the maximum correlation score is highlighted to the BEU, wherein positioning of the unknown, the known, the trusted and the untrusted SECs and CMSCs displayed in a sequence on the display screen follows a most accessible screen space to least accessible screen space approach that drives the BEU to explore the unknown, wherein determining the correlation score comprising the steps of:

receiving a price and a time range by the BEU;

creating a set of concentric circles with the BEU as center and making a table with columns including unknown SEC, unknown CMSC, trusted SEC, trusted CMSC, not-trusted SEC, not-trusted CMSC;

assigning a threshold value for each inner concentric circle;

picking the threshold value for a value of the geo-radius and populate a row of the corresponding columns if any one of published contract values of the unknown SEC, the unknown CMSC, the trusted SEC, the trusted CMSC, the not-trusted SEC, the not-trusted CMSC satisfy a criteria that their price minus the received BEU price is within the threshold value;

determining a frequency count of interaction between a SEC and a CMSC and a frequency count of interaction between the SEC and the BEU; and determining a mean profit for the CMSC, the SEC and the BEU based on the frequency count of interaction between the SEC and the CMSC and the frequency count of interaction between the SEC and the BEU;

detecting, by the one or more hardware processors of the mobile device, one or more predefined gestures performed by the BEU to accordingly explore the plurality of SECs and the plurality CMSCs to be displayed on the display screen and in accordance with the one or more predefined gestures updating the maximum correlation score based on an updated plurality of SECs and an updated plurality of CMSCs displayed on the display screen, wherein the BEU has option to terminate the exploration when an intended maximum correlation score is displayed, wherein when the mobile device is dynamically updating the maximum correlation score at a predefined frequency, real-time or live values are displayed on the display screen of the mobile device;

prompting, by the one or more hardware processors of the mobile device, the BEU to select a contract partner for trading of at least one of i) the physical asset holding and ii) the associated status information of the physical asset holding from the updated plurality of SECs and the updated plurality of CMSCs;

initiating, by the one or more hardware processors of the mobile device, a digital contract between the BEU and the selected contract partner, wherein the digital contract is recorded on detecting a predefined confirmation gesture on the display screen, wherein the digital contract is agreed and executed on a shared common ledger, and wherein the digital contract enables direct trading of at least one of i) the physical asset holding, and ii) the associated status information of the physical asset holding;

avoiding a dominance or a local maxima of a payout (PEU) performed by the SEC to the BEU due to a singular SEC by encouraging the BEU to engage with the SEC with a lower interaction or repeat engagement as compared to other SEC with a higher interaction or repeat engagement, thereby enabling the BEU to explore and builds resilience into sourcing of profits (PTEU) as the value is now contributed to by the other SEC;

halting decomposition of a grid layout of the display screen of the BEU into a grid each corresponding to each of the plurality of SECs when a grid size reduces below 24 pixels square which is a physiological constraint imposed by a tip of a finger;

masking information displayed to the SEC or the CMSC by distributing information visibility to a SEC and a CMSC for a set of K BEUs by dividing a time window between K unit to provide uniform distribution, thereby controlling supply from the BEU;

normalizing, by the one or more hardware processors of the mobile device, a time scale running into thousands of hours to a 24 hour time scale by mapping the time scale running into thousands of hours into the 24 hour time scale to reduce computation time in a system and providing a usable value for numerical calculations; and personalizing the display of the information by tuning an interface layout to adapt to specified values of a type of user along 3 axes of goals-time, cognitive capabilities, and physiological capabilities based on context of the type of user including the BEU, the SEC or the CMSC, wherein dynamic just-in-time display information on the display screen of the mobile device of the BEU as per the BEU's goals, time, trust, space expectations, which allows the BEU to optimize on the specified goal within the specified time, wherein the BEU is digitally auto-registered with the plurality of SECs on the shared common ledger of a blockchain network wherein the plurality of SECs meet the goals set by the BEU.

2. The processor implemented method of claim 1, wherein a first type of a default display mode arranges each of the plurality of SECs and the plurality of CMSCs from center of the display screen in accordance with descending order of the correlation score indicating a proximity of a SEC and a CMSC to the goal using a recursive display approach, wherein the SEC and the CMSC are segregated on the screen space based on the known and the unknown SECs and CMSCs; and wherein a unique usable color coding is displayed to differentiate the known and the unknown, the SECs and the CMSCs.

3. The processor implemented method of claim 2, wherein the one or more plurality of gestures defined for the first type of the default display mode comprises:

pinch-zoom to navigate panning positive and negative Z-axis, wherein a pinch gesture displays only the plurality of SECs, and a zoom gesture displays only the plurality-of CMSCs, wherein a zoom in and a zoom out gesture varies a geo-radius considered to identify the plurality of SECs and the plurality of CMSCs in a particular region being searched;

swipe left-right panning positive and negative X-axis, wherein a swipe left gesture displays only the plurality of SECs and a swipe right gesture displays only the plurality of CMSCs; and swipe up-down panning positive and negative Y-axis, wherein a swipe up gesture displays only the plurality of SECs and a swipe down gesture displays only the plurality of CMSCs.

4. The processor implemented method of claim 1, wherein a second type of a default display mode arranges each of the plurality of SECs and the plurality of CMSCs from center of the display screen in accordance with a paper windmill visual design approach, wherein the plurality of entities including the plurality of SECs and the plurality of CMSCs are positioned in a clockwise direction starting from a pinhole and upon selecting an entity the paper windmill visual design approach recursively expands sub-entities, wherein the plurality of entities and the sub-entities are labelled using a digital labelling, wherein the sub-entities are positioned on empty corners of the selected entity in a clockwise direction and when a sub-entity is not placed on an empty corner, then the sub-entity is labelled using an alphabet labelling which is placed equidistantly with other sub-entities, and wherein the alphabet labelling runs in an opposite direction of the digital labelling.

5. The processor implemented method of claim 4, wherein the one or more plurality of gestures defined for the second type of the default display mode comprises:

a Circular Anticlockwise fast gesture provides fast sampling of the plurality of the SECs;

a Circular Anticlockwise slow gesture provides slow sampling of the plurality of the SECs;

a Circular Clockwise fast gesture provides fast sampling of the plurality of the CMSCs; and a Circular Clockwise slow gesture provides slow sampling of the plurality of the CMSCs.

6. The processor implemented method of claim 1, wherein, the unknown SECs and the unknown CMSCs are identified as the known SECs and known CMSCs when the digital contract is recorded with BEU, the known SECs and CMSCs are identified as trusted when the digital contract is executed successfully, and the known SECs and CMSCs are identified as untrusted if the digital contract is not respected or contested, as claimed by either or any party of the digital contract; and wherein, determining whether each of the plurality of SECs and the plurality of CMSCs is profitable with financial solvency is based on filed public records for each of the plurality of SECs and the plurality of CMSCs that are managed by an authority.

7. The processor implemented method of claim 1, wherein generating the digitally virtualized space for each of the physical asset holding and the associated status information of the physical asset holding comprises:

acquiring a mobile contact number associated with mobile device by querying the mobile device for Subscriber Identity Module (SIM) information;

retrieving information associated with identity of the BEU from one or more databases using the acquired contact number;

extracting information on the physical asset holding and the associated status information of the physical asset holding, associated geo location of the BEU from the retrieved information; and generating the digitally virtualized space based on the extracted information for displaying on the display screen.

8. The processor implemented method of claim 1, wherein the BEU communicates via the application (app) installed on the mobile device of the BEU and executed by the one or more hardware processors, wherein the BEU capabilities are expressed along the 3 axes of goals-time, cognitive capabilities, and physiological capabilities, wherein the app dynamically controls the layout manager via the multi-armed bandit algorithm rather than a static XML layout, and wherein a data associated with a virtualized representation of the plurality of physical asset holdings is in an Extensible Markup Language-Document Type Definition (XML-DTD) format tagged with a unique identifier of each BEU and each data unit of the BEU is associated with one or more entities of a SEC plane, a CMSC plane and this association is recorded on the shared common ledger of the blockchain network.

9. The processor implemented method of claim 8, wherein the plurality of SECs and the plurality of CMSCs have the app installed on mobile devices respectively and respond to the digital contract initiated by the BEU, and wherein the plurality of SECs and the plurality of CMSCs utilize services of a Non-Living Legal Plane (NLLP) for offering trading pertaining to at least one of i) the physical asset holding and ii) the associated status information of the physical asset holding of a plurality of BEUs, and wherein the SEC having the digital contract with the BEU utilizes the app to explore the plurality of CMSCs, select one CMSC and initiate and record a digital contract with the CMSC.

10. The processor implemented method of claim 1, RR wherein the score is incremented by '1' or a fractional value for every successful execution of the digital contract and is decremented by '1' or a fractional value for every contested execution.

11. A system comprising:

a plurality of mobile devices enabling each of a plurality of Basic Emergent Users (BEUs), each of a plurality of Socio Economic Cohorts (SECs) and a plurality of Contract Management System Companies (CMSCs) to discover and utilize information about each other via application (app) installed on each of the plurality of mobile devices, a mobile device among the plurality of mobile devices, operated by a from among the plurality of BEUs comprising;

one or more Input/Output (I/O) interfaces; and one or more hardware processors coupled to the memory via the one or more I/O interfaces, wherein the one or more hardware processors are configured by the instructions to:

display by the mobile device of the BEU, a digitally virtualized physical space of a plurality of physical asset holdings of a Basic Emergent User (BEU) on a display screen of the mobile device on detecting an activation event, wherein the digitally virtualized physical space for each of the plurality of physical asset holdings is associated with a geographical location validated by satellite sensors and remote sensing using hyperspectral imaging, wherein the activation event is triggered upon opening the application installed on the mobile device of the BEU;

prompt the BEU to provide a goal in terms of a tuple comprising i) an expected profit range, indicative of selling price and a tolerance around the selling price, for a physical asset holding among the plurality of physical asset holdings and an associated status information of the physical asset holding, and ii) a time range within which the expected profit range is to be obtained, wherein the BEU selects the physical asset holding via the digitally virtualized physical space displayed on the display screen;

populate a plurality of Socio Economic Cohorts (SECs) and a plurality of Contract Management System Companies (CMSCs) having a positive Reputation Risk (RR) score to be displayed on the display screen based on a plurality of conditions comprising:

the plurality of SECs and the plurality of CMSCs lie within a satellite based sensor ascertained geo-radius with the physical asset holding as a center, wherein the geo-radius is derived from the time range, the plurality of SECs and the plurality of CMSCs satisfy a criteria of being profitable with financial solvency and the positive RR score, the plurality of SECs and the plurality of CMSCs is a mix of known, unknown, trusted, and untrusted SECs and CMSCs, wherein the known, the unknown, the trusted, and the untrusted SECs and CMSCs are discovered by querying and looking at digital records in a repository of Filed Public records (FPR) from CMSCs, and the repository of the FPR is internal or external to the mobile device and the repository of the FPR is periodically updated, and the plurality of SECs and the plurality of CMSCs for which the selling price and the tolerance provided by the BEU and a buying price and the tolerance specified by a SEC or a CMSC is within a pre-defined limit to maximize a BEU profit equation, wherein the plurality of SECs and the plurality of CMSCs are displayed at zones having a higher probability compared to other zones on the display screen of the mobile device via a layout manager, wherein the RR score is a continuous computation process for each of the BEU, the SEC and the CMSC based the success and failure of the digital contract each time, and the RR score is used in a structural layout of an interface on mobile devices of the BEU, the SEC, the CMSC in a discovery phase on initial layout and layout updating on a user gesture, and wherein the layout manager is controlled by a multi-armed bandit algorithm assigning exposure weights to a plurality of entities based on an optimal exploration-exploitation balance and the RR score;

determine a correlation score based on correlation between i) the expected profit range indicative of the selling price and the tolerance around the selling price, provided by the BEU and ii) the buying price and the tolerance specified by the SEC or the CMSC displayed on the display screen, wherein a maximum correlation score is displayed on the display screen and the SEC or the CMSC associated with the maximum correlation score is highlighted to the BEU, wherein positioning of the unknown, the known, the trusted and the untrusted SECs and CMSCs displayed in a sequence on the display screen follows a most accessible screen space to least accessible screen space approach that drives the BEU to explore the unknown, wherein determining the correlation score comprising the steps of:

receiving a price and a time range by the BEU;

creating a set of concentric circles with the BEU as center and making a table with columns including unknown SEC, unknown CMSC, trusted SEC, trusted CMSC, not-trusted SEC, not-trusted CMSC;

assigning a threshold value for each inner concentric circle;

picking the threshold value for a value of the geo-radius and populate a row of the corresponding columns if any one of published contract values of the unknown SEC, the unknown CMSC, the trusted SEC, the trusted CMSC, the not-trusted SEC, the not-trusted CMSC satisfy a criteria that their price minus the received BEU price is within the threshold value;

determining a frequency count of interaction between a SEC and a CMSC and a frequency count of interaction between the SEC and the BEU; and determining a mean profit for the CMSC, the SEC and the BEU based on the frequency count of interaction between the SEC and the CMSC and the frequency count of interaction between the SEC and the BEU;

detect one or more predefined gestures performed by the BEU to accordingly explore the plurality of SECs and the plurality CMSCs to be displayed on the display screen and in accordance with the one or more predefined gestures updating the maximum correlation score based on an updated plurality of SECs and an updated plurality of CMSCs displayed on the display screen, wherein the BEU has option to terminate the exploration when an intended maximum correlation score is displayed, wherein as the mobile device is dynamically updating the maximum correlation score at a predefined frequency, real-time or live values are displayed on the display screen of the mobile device;

prompt the BEU to select a contract partner for trading of at least one of i) the physical asset holding and ii) the associated status information of the physical asset holding from the updated plurality of SECs and the updated plurality of CMSCs;

initiate a digital contract between the BEU and the selected contract partner, wherein the digital contract is recorded on detecting a predefined confirmation gesture on the display screen, wherein the digital contract is agreed and executed on a shared common ledger, and wherein the digital contract enables direct trading of at least one of i) the physical asset holding, and ii) the associated status information of the physical asset holding;

avoid a dominance or a local maxima of a payout (PEU) performed by the SEC to the BEU due to a singular SEC by encouraging the BEU to engage with the SEC with a lower interaction or repeat engagement as compared to other SEC with a higher interaction or repeat engagement, thereby enabling the BEU to explore and builds resilience into sourcing of profits (PTEU) as the value is now contributed to by the other SEC;

halt decomposition of a grid layout of the display screen of the BEU into a grid each corresponding to each of the plurality of SECs when a grid size reduces below 24 pixels square which is a physiological constraint imposed by a tip of a finger;

mask information displayed to the SEC or the CMSC by distributing information visibility to a SEC and a CMSC for a set of K BEUs by dividing a time window between K unit to provide uniform distribution, thereby controlling supply from the BEU;

normalize a time scale running into thousands of hours to a 24 hour time scale by mapping the time scale running into thousands of hours into the 24 hour time scale to reduce computation involving time in the system and providing a usable value for numerical calculations; and personalize the display of the information by tuning an interface layout to adapt to specified values of a type of user along 3 axes of goals-time, cognitive capabilities, and physiological capabilities based on context of the type of user including the BEU, the SEC or the CMSC, wherein dynamic just-in-time display information on the display screen of the mobile device of the BEU as per the BEU's goals, time, trust, space expectations, which allows the BEU to optimize on the specified goal within the specified time, wherein the BEU is digitally auto-registered with the plurality of SECs on the shared common ledger of a blockchain network wherein the plurality of SECs meet the goals set by the BEU.

12. The system of claim 11, wherein a first type of a default display mode arranges each of the plurality of SECs and the plurality of CMSCs from center of the display screen in accordance with descending order of the correlation score indicating a proximity of a SEC and a CMSC to the goal using a recursive display approach, wherein the SEC and the CMSC are segregated on the screen space based on the known and the unknown SECs and CMSCs; and wherein a unique usable color coding is displayed to differentiate the known and the unknown, the SECs and the CMSCs.

13. The system of claim 12, wherein the one or more plurality of gestures defined for the first type of the default display mode comprises:

pinch-zoom to navigate panning positive and negative Z-axis, wherein a pinch gesture displays only the plurality of SECs, and a zoom gesture displays only the plurality-of CMSCs;

swipe left-right panning positive and negative X-axis, wherein a swipe left gesture displays only the plurality of SECs and a swipe right gesture displays only the plurality of CMSCs; and swipe up-down panning positive and negative Y-axis, wherein a swipe up gesture displays only the plurality of SECs and a swipe down gesture displays only the plurality of CMSCs.

14. The system of claim 11, wherein a second type of a default display mode arranges each of the plurality of SECs and the plurality of CMSCs from center of the display screen in accordance with a paper windmill visual design approach.

15. The system of claim 14, wherein the one or more plurality of gestures defined for the second type of the default display mode comprises:

a Circular Anticlockwise fast gesture provides fast sampling of the plurality of the SECs;

a Circular Anticlockwise slow gesture provides slow sampling of the plurality of the SECs;

a Circular Clockwise fast gesture provides fast sampling of the plurality of the CMSCs; and a Circular Clockwise slow gesture provides slow sampling of the plurality of the CMSCs.

16. The system of claim 11, wherein, the unknown SECs and the unknown CMSCs are identified as the known SECs and known CMSCs when the digital contract is recorded with BEU, the known SECs and CMSCs are identified as trusted when the digital contract is executed successfully, and the known SECs and CMSCs are identified as untrusted if the digital contract is not respected or contested, as claimed by either or any party of the digital contract.

17. The system of claim 11, wherein determining whether each of the plurality of SECs and the plurality of CMSCs is profitable with financial solvency is based on filed public records for each of the plurality of SECs and the plurality of CMSCs that are managed by an authority.

18. The system of claim 11, wherein generating the digitally virtualized space for each of the physical asset holding and the associated status information of the physical asset holding comprises:

acquiring a mobile contact number associated with mobile device by querying the mobile device for Subscriber Identity Module (SIM) information;

retrieving information associated with identity of the BEU from one or more databases using the acquired contact number;

extracting information on the physical asset holding and the associated status information of the physical asset holding, associated geo location of the BEU from the retrieved information; and generating the digitally virtualized space based on the extracted information for displaying on the display screen.

19. The system of claim 11, wherein the plurality of SECs and the plurality of CMSCs, via the app installed on the mobile devices respectively from among the plurality of mobile devices respond to the digital contract initiated by the BEU, and wherein the plurality of SECs and the plurality of CMSCs utilize services of a Non-Living Legal Plane (NLLP) for offering trading pertaining to at least one of i) the physical asset holding and ii) the associated status information of the physical asset holding of a plurality of BEUs, and wherein the SEC having the digital contract with the BEU utilizes the app to explore the plurality of CMSCs, select one CMSC and initiate and record a digital contract with the CMSC; and wherein the RR score is incremented by '1' or a fractional value for every successful execution of the digital contract and is decremented by '1' or a fractional value for every contested execution.

20. One or more non-transitory machine-readable information storage mediums comprising one or more instructions which when executed by one or more hardware processors cause:

displaying a digitally virtualized physical space of a plurality of physical asset holdings of a Basic Emergent User (BEU) on a display screen of the mobile device on detecting an activation event, wherein the digitally virtualized physical space for each of the plurality of physical asset holdings is associated with a geographical location validated by satellite sensors and remote sensing using hyperspectral imaging, wherein the activation event is triggered upon opening an application installed on the mobile device of the BEU;

prompting the BEU to provide a goal in terms of a tuple comprising i) an expected profit range, indicative of selling price and a tolerance around the selling price, for a physical asset holding among the plurality of physical asset holdings and an associated status information of the physical asset holding, and ii) a time range within which the expected profit range is to be obtained, wherein the BEU selects the physical asset holding via the digitally virtualized physical space displayed on the display screen;

populating a plurality of Socio Economic Cohorts (SECs) and a plurality of Contract Management System Companies (CMSCs) having a positive Reputation Risk (RR) score to be displayed on the display screen based on a plurality of conditions comprising:

the plurality of SECs and the plurality of CMSCs lie within a satellite based sensor ascertained geo-radius with the physical asset holding as a center, wherein the geo-radius is derived from the time range, the plurality of SECs and the plurality of CMSCs satisfy a criteria of being profitable with financial solvency and the positive RR score, the plurality of SECs and the plurality of CMSCs is a mix of known, unknown, trusted, and untrusted SECs and CMSCs, wherein the known, the unknown, the trusted, and the untrusted SECs and CMSCs are discovered by querying and looking at digital records in a repository of Filed Public records (FPR) from CMSCs, and the repository of the FPR is internal or external to the mobile device and the repository of the FPR is periodically updated, and the plurality of SECs and the plurality of CMSCs for which the selling price and the tolerance provided by the BEU and a buying price and the tolerance specified by a SEC or a CMSC is within a predefined limit to maximize a BEU profit equation, wherein the plurality of SECs and the plurality of CMSCs are displayed at zones having a higher probability compared to other zones on the display screen of the mobile device via a layout manager, wherein the RR score is a continuous computation process for each of the BEU, the SEC and the CMSC based the success and failure of the digital contract each time, and the RR score is used in a structural layout of an interface on mobile devices of the BEU, the SEC, the CMSC in a discovery phase on initial layout and layout updating on a user gesture, and wherein the layout manager is controlled by a multi-armed bandit algorithm assigning exposure weights to a plurality of entities based on an optimal exploration-exploitation balance and the RR score;

determining a correlation score based on correlation between i) the expected profit range indicative of the selling price and the tolerance around the selling price, provided by the BEU and ii) the buying price and the tolerance specified by the SEC or the CMSC displayed on the display screen, wherein a maximum correlation score is displayed on the display screen and the SEC or the CMSC associated with the maximum correlation score is highlighted to the BEU, wherein positioning of the unknown, the known, the trusted and the untrusted SECs and CMSCs displayed in a sequence on the display screen follows a most accessible screen space to least accessible screen space approach that drives the BEU to explore the unknown, wherein determining the correlation score comprising the steps of:

receiving a price and a time range by the BEU;

creating a set of concentric circles with the BEU as center and making a table with columns including unknown SEC, unknown CMSC, trusted SEC, trusted CMSC, not-trusted SEC, not-trusted CMSC;

assigning a threshold value for each inner concentric circle;

picking the threshold value for a value of the geo-radius and populate a row of the corresponding columns if any one of published contract values of the unknown SEC, the unknown CMSC, the trusted SEC, the trusted CMSC, the not-trusted SEC, the not-trusted CMSC satisfy a criteria that their price minus the received BEU price is within the threshold value;

determining a frequency count of interaction between a SEC and a CMSC and a frequency count of interaction between the SEC and the BEU; and determining a mean profit for the CMSC, the SEC and the BEU based on the frequency count of interaction between the SEC and the CMSC and the frequency count of interaction between the SEC and the BEU;

detecting one or more predefined gestures performed by the BEU to accordingly explore the plurality of SECs and the plurality CMSCs to be displayed on the display screen and in accordance with the one or more predefined gestures updating the maximum correlation score based on an updated plurality of SECs and an updated plurality of CMSCs displayed on the display screen, wherein the BEU has option to terminate the exploration when an intended maximum correlation score is displayed, wherein as the mobile device is dynamically updating the maximum correlation score at a predefined frequency, real-time or live values are displayed on the display screen of the mobile device;

prompting the BEU to select a contract partner for trading of at least one of i) the physical asset holding and ii) the associated status information of the physical asset holding from the updated plurality of SECs and the updated plurality of CMSCs;

initiating a digital contract between the BEU and the selected contract partner, wherein the digital contract is recorded on detecting a predefined confirmation gesture on the display screen, wherein the digital contract is agreed and executed on a shared common ledger, and wherein the digital contract enables direct trading of at least one of i) the physical asset holding, and ii) the associated status information of the physical asset holding;

avoiding a dominance or a local maxima of a payout (PEU) performed by the SEC to the BEU due to a singular SEC by encouraging the BEU to engage with the SEC with a lower interaction or repeat engagement as compared to other SEC with a higher interaction or repeat engagement, thereby enabling the BEU to explore and builds resilience into sourcing of profits (PTEU) as the value is now contributed to by the other SEC;

halting decomposition of a grid layout of the display screen of the BEU into a grid each corresponding to each of the plurality of SECs when a grid size reduces below 24 pixels square which is a physiological constraint imposed by a tip of a finger;

masking information displayed to the SEC or the CMSC by distributing information visibility to a SEC and a CMSC for a set of K BEUs by dividing a time window between K unit to provide uniform distribution, thereby controlling supply from the BEU;

normalizing a time scale running into thousands of hours to a 24 hour time scale by mapping the time scale running into thousands of hours into the 24 hour time scale to reduce computation time in a system and providing a usable value for numerical calculations; and personalizing the display of the information by tuning an interface layout to adapt to specified values of a type of user along 3 axes of goals-time, cognitive capabilities, and physiological capabilities based on context of the type of user including the BEU, the SEC or the CMSC, wherein dynamic just-in-time display information on the display screen of the mobile device of the BEU as per the BEU's goals, time, trust, space expectations, which allows the BEU to optimize on the specified goal within the specified time, wherein the BEU is digitally auto-registered with the plurality of SECs on the shared common ledger of a blockchain network wherein the plurality of SECs meet the goals set by the BEU.

* * * * *